US011330016B2

(12) United States Patent
Arbel et al.

(10) Patent No.: US 11,330,016 B2
(45) Date of Patent: May 10, 2022

(54) GENERATING COLLECTION RULES BASED ON SECURITY RULES

(71) Applicant: Imperva, Inc., Redwood City, CA (US)

(72) Inventors: Nadav Avital Arbel, Pardes Hana Karkur (IL); Luda Lazar, Petah Tikva (IL); Gilad Yehudai, Herzeliya (IL)

(73) Assignee: Imperva, Inc., San Mateo, CA (US)

( * ) Notice: Subject to any disclaimer, the term of this patent is extended or adjusted under 35 U.S.C. 154(b) by 600 days.

(21) Appl. No.: 16/236,071

(22) Filed: Dec. 28, 2018

(65) Prior Publication Data

US 2020/0213359 A1 Jul. 2, 2020

(51) Int. Cl.
*H04L 29/06* (2006.01)

(52) U.S. Cl.
CPC .......... *H04L 63/20* (2013.01); *H04L 63/1416* (2013.01)

(58) Field of Classification Search
CPC . H04L 63/14; H04L 63/1408; H04L 63/1416; H04L 63/1458; H04L 63/1466; H04L 63/168; H04L 63/20; H04L 63/1483; H04L 67/02
See application file for complete search history.

(56) References Cited

U.S. PATENT DOCUMENTS

| 10,264,003 B1* | 4/2019 | Wu ..................... H04L 41/0681 |
| 2008/0301769 A1* | 12/2008 | Parkinson ........... H04L 61/1523 726/2 |
| 2014/0317739 A1* | 10/2014 | Be'ery .................... H04L 63/16 726/23 |
| 2015/0236895 A1* | 8/2015 | Kay ...................... H04L 43/045 709/224 |
| 2017/0063905 A1* | 3/2017 | Muddu ............... H04L 63/1416 |
| 2019/0034254 A1* | 1/2019 | Nataraj ................ G06F 11/079 |

* cited by examiner

*Primary Examiner* — Robert B Leung
(74) *Attorney, Agent, or Firm* — Nicholson, De Vos, Webster & Elliott, LLP

(57) ABSTRACT

A computing device is described that is coupled to a set of web application layer attack detectors (ADs), which are coupled between clients and web application servers. The ADs apply security rules to traffic between clients and servers and send alert packages to the computing device in response to triggering one or more security rules, which identify web application layer attacks. The computing device automatically generates attribute identifier-value pairs based on alert packages and uses the attribute identifier-value pairs along with collection rule templates to generate collection rules, which are used to inspect traffic for additional analysis. The ADs apply the collection rules to traffic and send collection packages to the computing device in response to triggering one or more collection rules.

28 Claims, 10 Drawing Sheets

GENERATING COLLECTION RULES BASED ON SECURITY RULES

FIELD

Embodiments of the invention relate to the field of networks; and more specifically, to network security and generating security rules, which inspect traffic for web application layer attacks, based on collection rules, which perform additional analysis on traffic.

BACKGROUND

The content of Hypertext Transfer Protocol (HTTP) messages is transmitted within the application layer ("Layer 7") of the Open Systems Interconnection (OSI) model (ISO/IEC 7498-1), and may also be referred to as web application layer data. The OSI model was developed to establish standardization for linking heterogeneous communication systems, and describes the flow of information from a software application of a first computer system to a software application of a second computer system through a communications network. The OSI model has seven functional layers including a physical link layer, a data link layer, a network layer, a transport layer, a session layer, a presentation layer, and an application layer. A few examples of application layer protocols include, but are not limited to, HTTP for web application communication, File Transfer Protocol (FTP) for file transmission, Internet Message Access Protocol (IMAP) and Post Office Protocol (POP) for email, Simple Mail Transfer Protocol (SMTP) for transmitting email, Internet Relay Chat (IRC) for real-time Internet text messaging, Session Initiation Protocol (SIP) for voice and video calling, and Network File System (NFS) for the remote access of files.

Another model detailing communications on the Internet is known as the Internet Protocol (IP) suite, and is sometimes referred to as "TCP/IP". In contrast to the OSI model, the Internet protocol suite is a set of communications protocols including four layers: a link layer, an internet layer, a transport layer, and an application layer. The link layer of the Internet protocol suite, which provides communication technologies for use in a local network, is often described as roughly analogous to a combination of the data link layer (layer 2) and physical layer (layer 1) of the OSI model. The internet layer (e.g., IP version 4 (IPv4), IP version 6 (IPv6)) of the Internet protocol suite, which provides for inter-networking and thus connects various local networks, is often described as roughly analogous to the network layer (layer 3) of the OSI model. The transport layer (e.g., Transmission Control Protocol (TCP), User Datagram Protocol (UDP)) of the Internet protocol suite, which allows for host-to-host communications, is often described as roughly analogous to the transport layer (layer 4) of the OSI model. Finally, the application layer of the Internet protocol suite includes the various protocols (e.g., HTTP, IMAP, FTP, SIP) for data communications on a process-to-process level, and is often described as analogous to a combination of the session, presentation, and application layers (layers 5-7, respectively) of the OSI model.

Regardless of the model considered, many common attacks are targeted at aspects of the network layer, the transport layer, and the application layer. The network layer, which is under the transport layer and routes data supplied by the transport layer, manages delivery of packets between computing devices that may be connected to different networks and separated by one or more other networks. The network layer is responsible for logical addressing, which includes managing mappings between IP addresses and computing devices on a worldwide basis. The network layer is also responsible for ensuring that packets sent to computing devices on different networks are able to successfully navigate through the various networks successfully and arrive at the proper intended destinations. Network devices such as routers and gateways predominantly operate at the network layer. The transport layer, which is under the application layer, provides end-to-end communication services by providing reliable delivery of an entire message from a source to a destination, sometimes using multiple packets. While the network layer typically handles each packet independently, the transport layer manages the relationships between the packets to ensure that the entire message arrives at the destination and can be reassembled in the correct order to recreate the original message. The application layer typically operates as the top layer in networking models and carries application-specific data, such as HTTP request and response messages.

Application layer attacks typically target web applications executed by web application servers (in which case, they are referred to as web application layer attacks). A web application server is system software (running on top of an operating system) executed by server hardware upon which web applications run. Web application servers may include a web server (e.g. Apache, Microsoft® Internet Information Server (IIS), nginx, lighttpd), which delivers web pages on the request of HTTP clients using HTTP, and may also include an application server that executes procedures (i.e., programs, routines, scripts) of a web application. Web application servers typically include web server connectors, computer programming language libraries, runtime libraries, database connectors, and/or the administration code needed to deploy, configure, manage, and connect these components. Web applications are computer software applications made up of one or more files including computer code that run on top of web application servers and are written in a language the web application server supports. Web applications are typically designed to interact with HTTP clients by dynamically generating HTML responsive to HTTP request messages sent by those HTTP clients. Many web applications utilize databases (e.g., relational databases such as PostgreSQL, MySQL, and Oracle, and non-relational databases, also known as NoSQL databases, such as MongoDB, Riak, CouchDB, Apache Cassandra and HBase) to store information received from HTTP clients and/or information to be displayed to HTTP clients.

HTTP clients interact with web applications by transmitting HTTP request messages to web application servers, which execute portions of web applications and return web application data in the form of HTTP response messages back to the HTTP clients, where the web application data may be rendered using a web browser. Thus, HTTP functions as a request-response protocol in a client-server computing model, where the web application servers typically act as the "server" and the HTTP clients typically act as the "client."

HTTP Resources are identified and located on a network by Uniform Resource Identifiers (URIs)—or, more specifically, Uniform Resource Locators (URLs)—using the HTTP or HTTP Secure (HTTPS) URI schemes. URLs are specific strings of characters that identify a particular reference available using the Internet. URLs typically contain a protocol identifier or scheme name (e.g. http, https, ftp), a colon, two slashes, and one or more of user credentials, server name, domain name, IP address, port, resource path, query string, and fragment identifier, which may be separated by periods and/or slashes. The original versions of HTTP—HTTP/0.9 and HTTP/1.0—were revised in Internet Engineering Task Force (IETF) Request For Comments (RFC) 2616 as HTTP/1.1, which is in common use today. A new version of the HTTP protocol, HTTP/2.0, is currently being developed by the Hypertext Transfer Protocol Bis (httpbis) working group of the IETF and is based upon the SPDY protocol. As HTTP/2.0 is expected to similarly utilize HTTP clients and HTTP request messages, the ideas discussed herein should largely (if not entirely) remain applicable to HTTP/2.0.

By way of an operational example, an HTTP client requests a web page from a web application server by sending it an HTTP request message. For example, to access the web page with a URL of "http://www.example.org/index.html", web browsers connect to the web application server at www.example.org by sending it an HTTP request message using a "GET" method, which looks like the following:
GET/index.html HTTP/1.1
Host: www.example.org The web application server replies by sending a set of HTTP headers along with the requested web page, which collectively is called an HTTP response message.

A HTTP message may include request lines, status lines, HTTP headers, a message body, and/or a trailer. Request lines, which are used in HTTP/1.1 request messages, include a method token field that identifies a method to be performed (e.g., "GET", "POST"), a Request URI field that identifies a URI of a resource upon which to apply the method (i.e., a requested URL), and a protocol version field (e.g., "HTTP/1.1"). Status lines, which are used in HTTP/1.1 response messages, include a protocol version field, a numeric status code field (e.g., 403, 404), and an associated textual explanatory phrase field (e.g., "Forbidden", "Not Found"). HTTP headers define the operating parameters of an HTTP transaction, and each HTTP header typically comprises a colon-separated name-value pair.

One type of HTTP header is a "Referer" header that allows a web browser to specify, for a web application server's benefit, an address (e.g., URI) of a resource (e.g., web page) from which the requested URI was obtained. For example, if a user clicks on a link from within a web page having a URI of "http://www.example.com/index.html", the resulting HTTP request message sent by the web browser may include a Referer header of "Referer: http://www.example.com/index.html" indicating that the HTTP request message was originated from that web page. Another type of HTTP header is a "User-Agent" header that indicates, for the web application server's benefit, what software and/or modules are utilized by the HTTP client making the request. For example, a User-Agent header may include one or more of a web browser product name and version number, a layout engine name and version number used by the web browser, an identifier of the type of machine and/or operating system of the user, and/or names of any extensions utilized by the web browser. For example, a User-Agent header transmitted from the Mozilla® Firefox® web browser executing on a computer utilizing the Microsoft® Windows® 7 operating system may be "Mozilla/5.0 (Windows; U; Windows NT 6.1; ru; rv:1.9.2) Gecko/20100115 Firefox/3.6". A core set of HTTP fields for "HTTP/1.1" is standardized by the IETF in RFC 2616, and other updates and extension documents (e.g., RFC 4229). Additional field names and permissible values may be defined by each application.

HTTP parameters are typically short pieces of data (i.e., attribute name and attribute value pairs) that are sent from the HTTP client to the web application server. HTTP parameters may be sent a variety of ways, such as including them in the Request URI of the request line of an HTTP request message utilizing the HTTP "GET" method (i.e., by tacking them on the end of the Request URI as a "query string"), or by including them in the message body of the HTTP request message when using the HTTP "POST" method. In principle, the HTTP GET method requests the contents of a particular URL, while the HTTP POST method "sends" data to a particular URL. By way of example, assume the below HTML form is provided to the HTTP client as part of a web page:

```
<form action="http://www.examplesite.com/login" method="get">
<input type=text name="username">
<input type=submit>
</form>
```

Responsive to this HTML form being displayed, a user may enter the username "mcjones" and submit this form, which causes the HTTP request parameter "?username=mcjones" to be tacked on the end of the URL to form http://www.examplesite.com/login?username=mcjones. In this example, "username" is deemed a field name or attribute name or attribute identifier, and "mcjones" can be deemed a user-entered value of the field/attribute or an attribute value.

In addition to sending user-submitted form data, HTTP request messages may also be used for other purposes, including: 1) to send data via some Application Programming Interface (API) to call a web application server; and 2) to send data to AJAX (Asynchronous JavaScript and XML) web applications. While formerly any user action required a web page to be reloaded from the web application server, AJAX allows an HTTP client to retrieve data from the web application server asynchronously in the background without interfering with the display and behavior of the existing page. For example, an AJAX call may load new content into a web page after the initial rendering of the page without having to reload or "refresh" the page (i.e., transmit another HTTP request for the web page and/or render the entire page once again).

Structured Query Language (SQL) is a special-purpose programming language allowing for declarative querying of data (typically) contained in a relational database. Relational databases model data storage using one or more tables having columns and rows storing values associated with the columns. Most SQL implementations include data insert commands (e.g., INSERT), query commands (e.g., SELECT), update commands (e.g., UPDATE), and delete (e.g., DELETE) commands, as well as schema creation, schema modification, and data access control commands. While relational databases are often referred to as SQL databases, other types of (non-relational) databases exist that are often referred to as NoSQL databases.

Many web applications utilize databases, both relational and non-relational, to store and provide data used by the web application, including but not limited to user data (passwords, user names, contact information, credit card information, web application history, etc.) and other site-specific data including but not limited to stories, comments, pictures, product information, sales information, financial records, and any other type of information utilized by or displayed by a web application. Because these databases often store confidential or private information, the databases are often configured to only provide access to the data stored therein to a limited number of users, geographic locations, and/or computing devices. For example, many databases are configured to only allow access to a particular web application server.

However, due to the sensitive and important data in these databases, they are often targeted by third parties seeking unauthorized, and possibly malicious, access. For example, attackers may attempt to perform SQL Injection (SQLi) attacks (a form of web application layer attack, which is a form of application layer attack) by sending carefully crafted HTTP request messages to a web application server that may cause the web application to interact with its database under the direction of the attacker. In particular, a SQLi attack is an attack where an attacker includes portions of SQL statements in a web form input element (or directly within a "GET" or "POST" HTTP request message) to a web application in an attempt to get the web application to transmit these portions of SQL statements to a database to be executed. Thus, the attacker may be granted unauthorized access or power to modify data within the database, and may display database schema information (e.g., a list of tables and settings), display data stored in those tables (e.g., contact information, credit card information, and any other type of information), and/or update or delete database data and related data structures or metadata. Further, in some scenarios an attacker may even execute operating system commands through SQLi. One form of SQLi occurs when user input is directly used by a web application to craft a SQL statement/query but is not validated or "escaped" (e.g., inserting escape characters into a value to prevent it from being executed by a database). For example, a web application may contain the following PHP code creating a SQL command:

$sql="SELECT * FROM users WHERE user_id=$_GET [user_id]";

Assuming the web application does not validate user input data, if an attacker passes the web application a value for 'user_id' that is not a user ID but instead includes carefully crafted SQL code, the SQL code may be executed. For example, an attacker may send a 'user_id' value of:

1; DROP TABLE users;

This will cause the above PHP code to create the following SQL command that selects some arbitrary data from a 'users' table (the record having a user_id value equal to 1) but also deletes (i.e. drops) the 'users' table:

SELECT * FROM users WHERE user_id=1; DROP TABLE users;

While SQLi attacks can be prevented through careful construction of web applications—for example, by validating and/or sanitizing (e.g., escaping) input provided to the web application by its users—such careful construction is not always used during the construction of all web applications.

Attackers may also attempt to perform Cross-Site Request Forgery (CSRF) attacks. CSRF attacks work by abusing the trust between a web application and a particular client to perform an application level transaction on behalf of the attacker using the identity of the client. In particular, a CSRF attack is an attack in which an attacker gets another user to unknowingly access a web application to which the user is authenticated. Typically, the attacker is able to cause the victim's web browser to transmit unauthorized commands to the site, which are executed if the site trusts the victim's web browser. For example, an attacker may craft a malicious link, script (e.g., JavaScript), or HTTP element (e.g., an image) that is loaded by a victim's web browser. This malicious entity causes the victim's web browser to transmit an HTTP request message to a website that the victim has previously established a current session with. For example, if the victim's web browser has an unexpired cookie storing authentication information for the website (i.e., is still "logged on"), this malicious HTTP request message may be executed by the website, because it believes that the user is purposefully making the request. Thus, any web application that performs actions based upon input from trusted and authenticated users without requiring that the user authorizes the specific action is at risk. One method to prevent CSRF attacks is for the web application to check the "Referer Header" transmitted by the user's browser to ensure that the referrer page (i.e., the page on which the request was caused to be transmitted) is a known page of the web application, and not an unknown page such as one created or modified by an attacker.

Further, attackers may use Remote File Inclusion (RFI) attacks that target web application servers. An RFI attack is an attack in which an attacker is able to make a web application server include the contents of one or more remote files within a particular resource, which may then be executed, compiled, interpreted, or sent to another computer device. For example, an attacker may cause the web application server to retrieve and execute code from within a remote file (e.g., "PHP: Hypertext Preprocessor" (PHP) code, Active Server Pages (ASP) code, ASP.NET code, Perl code, etc.). Further, RFI attacks lead to the unauthorized access and/or manipulation of data from the web application server and/or database. RFI attacks are typically enabled through a failure of the web application to validate input variables (e.g., in PHP: $_GET, $_POST, $_COOKIE, $_REQUEST). Thus, by transmitting unanticipated input to the web application server through these input variables (i.e., in HTTP request messages), an attacker may cause a vulnerable web application to execute this unanticipated, non-validated user input. For example, if a PHP application includes an "include($_GET['template_id'])" statement or a "require $_GET['template_id']" statement, an attacker may pass a URL of a malicious file as part of an HTTP request message parameter. For example, an HTTP request message including a GET request for "/page.php?template_id=http:// www.example.com/attack.txt" will cause the web application to include the contents of the file located at "http:// www.example.com/attack.txt"—which may include malicious script (e.g., PHP) code, for example—when interpreting the page.php file to construct a web page for the user. Thus, the contents of the remote file will be executed by the web application server (when creating a web page). One method to prevent RFI attacks is for a web application to validate all inputs before using those inputs, or not allow user input to be directly used with "include" or "require"-type commands. Additionally, a web application can prevent RFI attacks by determining if the parameters of an HTTP request message match a regular expression pattern (e.g., "(ht|f)tps?:\/\/") that looks for the existence of "http", "https", "ftp", or "ftps", which indicates that the parameters are including a URI of a remote resource.

In addition to the attacks described above, attackers may use a variety of other web application layer attacks, including Cross-Site Scripting attacks and Clickjacking attacks (i.e., User Interface Redress Attacks). Web application layer attacks typically come from outside a network (e.g. a Local Area Network (LAN)) and are directed at one or more computing devices within that network. For example, SQL injection attacks are typically directed at web applications and databases executing on computing devices located within a LAN and come from computing devices located outside the LAN.

Given this reality, security devices (sometimes called web application firewalls) are commonly utilized to look for and prevent such attacks within HTTP traffic (i.e. web application layer traffic). In particular, an attack detector can examine traffic (e.g., packets) using a set of security rules to detect attacks of certain attack types. Each security rule includes a rule identifier (ID), which serves to uniquely identify a particular rule. Each security rule also includes a set of one or more conditions that define what to look for in traffic, and a set of one or more actions to be performed when a condition is met. A condition includes, for each security rule, one or more attributes. An attribute is a combination of an attribute identifier and a set of one or more attribute values. Attribute identifiers can identify particular protocol headers (e.g., a TCP header, an HTTP header) and/or header fields (e.g., a source or destination port of a TCP header, a Referer HTTP header field) used within a packet. Attribute identifiers can also identify metrics or characteristics of traffic that an attribute value represents. For example, an attribute identifier may be a number of packets or HTTP messages received over a defined period of time, and the corresponding attribute value 104 may be that particular number of packets or HTTP messages. Of course, the use of metrics or characteristics as attribute identifiers requires that the system have some way of determining the attribute values, such as by maintaining a separate table or database with relevant data necessary to perform the computation. Attribute identifiers may also identify portions of application layer data carried by packets, such as an HTTP request message, an HTTP response message, a SQL query, etc.

As noted above, each of the security rules also includes one or more actions to be performed when a condition of the security rule is satisfied. Actions can indicate one or more forwarding actions (e.g., drop the packet or message, temporarily hold the packet or message for further analysis, transmit the packet or message to a particular module or IP address, forward the packet or message to the intended destination) or modification actions (e.g., insert a value into the packet or message at a particular location, strip out a value from the packet or message, replace a value in the packet or message, etc.). The actions can also include instructions describing what information is to be placed into each alert package; for example, an action may direct that an attack type indication of "RFI attack" is to be included therein. Additionally, many other types of actions are well known to those of ordinary skill in the art, and thus these examples are not exhaustive.

In some systems, the security rules utilized by computing devices for security purposes may be described as detecting a particular type of attack and thus have an attack type. For example, a first security rule may detect SQLi attacks and be of a SQLi attack type, a second security rule may detect RFI attacks and be of an RFI attack type, a third security rule may detect denial of service (DoS) attacks and be of a DoS attack type, and a fourth security rule may detect CSRF attacks and thus be of a CSRF attack type.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
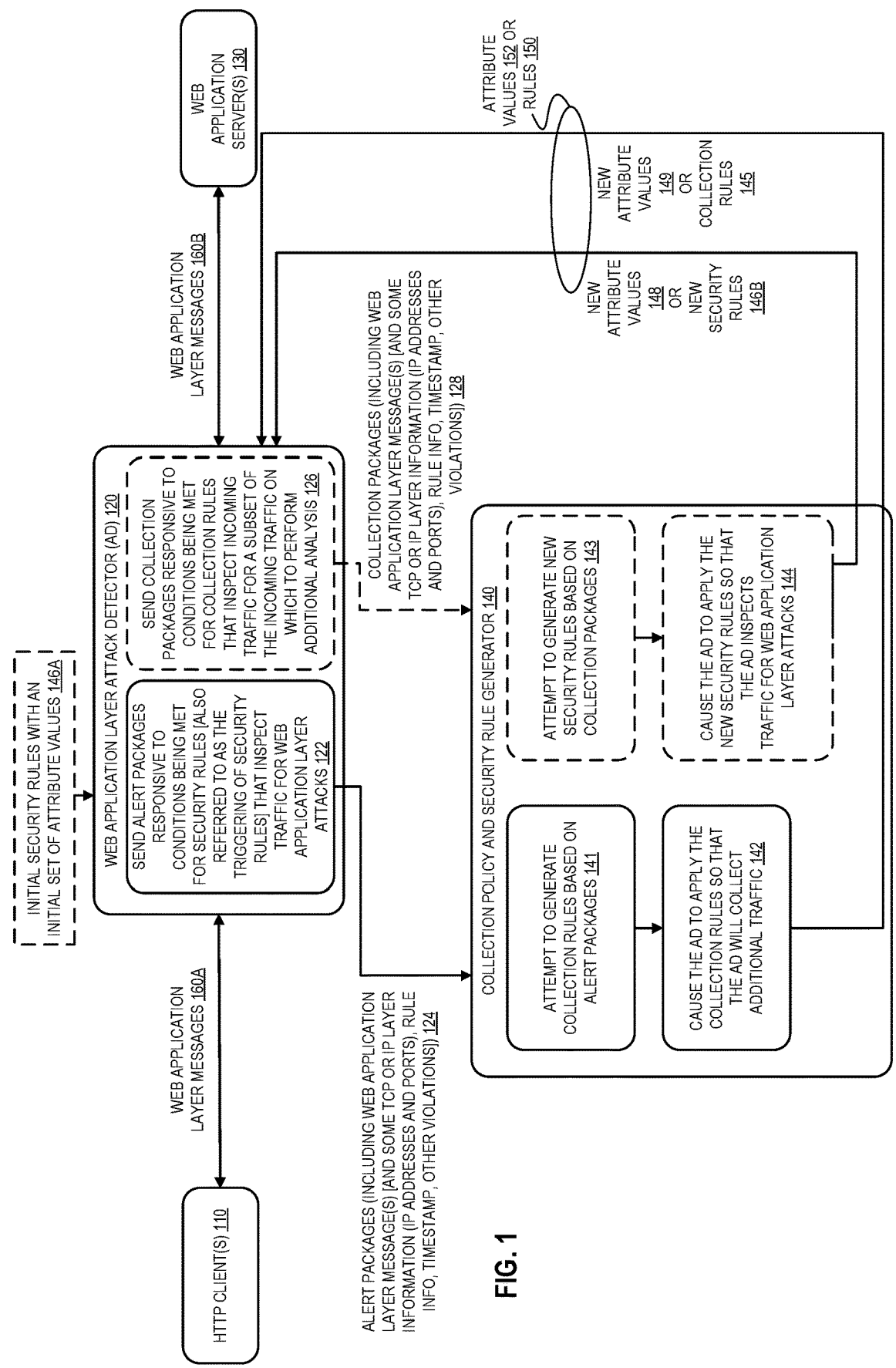
FIG. 1 is both a block and a flow diagram illustrating a general technique for automatically generating collection rules, including attribute values for one or more attribute identifiers, from packets carrying web application layer request messages, according to certain embodiments of the invention.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) is one type of "Uniform Resource Identifier" (URI), these terms are used interchangeably herein to refer to a URI, which is a string of characters used to identify a name or a web resource.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video). Client end stations (e.g., server hardware, workstations, laptops, netbooks, palm tops, mobile phones, smartphones, multimedia phones, Voice Over Internet Protocol (VOIP) phones, user equipment (UE), terminals, portable media players, GPS units, gaming systems, set-top boxes) may execute an HTTP client (e.g., a web browser) to access content and/or services provided over a LAN, over the Internet, and/or over virtual private networks (VPNs) overlaid on (e.g., tunneled through) the Internet. The content and/or services are typically provided by one or more end stations (e.g., server end stations comprising server hardware) running a web application server and belonging to a service or content provider or end stations participating in a peer to peer service, and may include, for example, public web pages (e.g., free content, store fronts, search services), private web pages (e.g., username/password accessed web pages providing email services), and/or corporate networks over VPNs.

Exemplary Overview

Attackers continually create attack variants by modifying the carefully crafted malicious HTTP request messages to avoid detection. Thus, attack variants and other "zero-day" attacks are continually crafted and deployed such that current security devices are unable to detect their use until a point when the attacks are ultimately detected and security professionals can manually analyze these attacks to determine their methods and vectors, and then design new security rules to prevent their continued use. However, this attack-detection-analysis-protection cycle leaves a "vulnerability window" wherein applications and networks are vulnerable to the new attacks during the portion of time between the first use of the new attack and the ultimate implementation of protection against the attack.

FIG. 1 is both a block and a flow diagram illustrating a general technique for automatically generating collection rules, including attribute values for one or more attribute identifiers, from packets carrying web application layer request messages, according to certain embodiments of the invention. The collection rules may thereafter be used to collect additional traffic from which the system may generate new security rules as will be described in greater detail below. In FIG. 1, a web application layer attack detector (AD) 120 is communicatively coupled between a set of one or more HTTP clients 110 and a set of one or more web application servers 130 to protect the web application servers 130 against web application layer attacks from the set of HTTP clients 110. The AD 120 is also communicatively coupled to a collection policy and security rule generator (CPSRG) 140. The AD 120 is configured to receive web application layer request messages 160A from the HTTP clients 110 (e.g., that are each carried by one or more packets), apply security rules and collection rules, and forward on acceptable web application layer request messages 160B toward the web application servers 130. In some embodiments, the AD 120 may also be configured to receive web application layer response messages 160B from the web application servers 130, apply security rules and collection rules, and transmit those acceptable web application layer response messages 160A to the HTTP clients 110.

As will be described in greater detail below, both security rules and collection rules are applied to traffic passing through to the AD 120. However, in contrast to security rules that inspect traffic for identification of web application layer attacks, collection rules inspect traffic for a subset of traffic passing through the AD 120 on which to perform additional analysis. Accordingly, while the AD 120 is sufficiently confident that traffic identified by the security rules contain or are otherwise associated with web application layer attacks to take some protective action (e.g., raise an alert and/or block traffic), the AD 120 does not do so for collection rules. Instead, the AD 120 and collection policy and security rule generator (CPSRG) 140 seeks to perform additional analysis on traffic identified by collection rules to determine if new security rules can be generated to identify web application layer attacks. In other words, while the triggering of security rules provides information about some traffic that can be further analyzed to generate new security rules, it is information about only those of the web application layer messages that are believed to be attacks with a sufficiently high level of confidence to take some protective action (typically, a relatively small subset of the web application layer messages passing through the AD 120). In contrast, the collection rules are intended to provide information about a larger subset of the traffic (but not all the traffic) passing through the AD 120 for the security rule generator (CPSRG) 140 to analyze. While the level of confidence that all the web application layer messages in this larger subset of the traffic includes attacks is not sufficiently high to take some protective action (e.g., raise an alert and/or block traffic), there is a sufficiently high level of confidence that further analysis of these web application layer messages may yield new security rules to warrant performing that analysis. The manner of generating the collection rules such that they collect this larger subset of the traffic that warrants further analysis is described in more detail later herein.

An AD 120 may be implemented as a separate component (e.g., the AD 120 may reside on a separate physical machine (sometimes referred to as a gateway) or a separate virtual machine (sometimes referred to as a remote agent or a remote sensor) from the web application server(s) 130 and CPSRG 140, fully or partially integrated as an in-process agent within each web application server 130 (i.e., the AD 120 is implemented as a loadable kernel component that is configured to see and analyze traffic being sent to and from a corresponding web application server 130), or fully or partially integrated with the CPSRG 140 (with this combination being a separate component from the web application server(s) 130). Also, an AD 120 may be deployed in a cloud (e.g., a cloud provided by the provider such as Amazon, Microsoft, etc.) or on premise. For example, in-process agent ADs may be deployed with the web application server(s) 130 in a cloud (e.g., a private cloud, a cloud provided by a cloud provider such as Amazon) or in multiple clouds, and these in-process agents ADs may be communicatively coupled with the CPSRG 140 and implemented as a separate component in the same or a different cloud. In some such embodiments, the web application servers(s) 130 may be operated by different entities (e.g., enterprises, companies, etc.) but the ADs are all communicatively coupled with the same CPSRG 140. Additionally or alternatively, there may also be gateway or remote agent ADs on premise and/or remote agent ADs in the cloud that are also communicatively coupled with the same CPSRG 140. Although FIG. 1 depicts only one AD 120, some embodiments of the invention utilize a plurality of ADs that protect one or more web application servers 130, and the plurality of ADs may include ADs owned and/or operated by one business enterprise or by multiple business enterprises and may be located at one geographic location or multiple disparate geographic locations.

When the AD 120 receives traffic (e.g., packets) carrying web application layer messages 160A-160B, the AD 120 applies security rules by determining whether a condition of any of the security rules is satisfied (also referred to as the triggering of security rules). In particular, as will be described in greater detail below, a security rule includes a rule identifier, a rule condition (which includes detection logic, attribute identifier(s), attribute value(s), and operations), and action(s). When a condition of a security rule that analyzes web application layer request messages 160A-160B for potential and/or actual web application layer attacks is met, the AD 120 sends 122 an alert package 124 to the CPSRG 140. The alert package 124, depending upon the embodiment of the invention, can include a variety of types of information related to the packets or web application layer messages, including but not limited to part or all the web application layer messages themselves, "packet parts" that include information from packet headers of the packet(s) carrying the web application layer messages that meet the rule condition (e.g., source or destination IP addresses from an IP header, source or destination ports from a TCP header or UDP header, a Media Access Control (MAC) address or Virtual LAN (VLAN) identifier value from an Ethernet header, etc.), an identifier of the matched security rule having the condition met, part or all of the condition of the matched security rule, an attack type of the matched security rule, a category of the matched security rule, a set of violation indicators describing other flaws or departures from a proper protocol found in the packets, and/or a timestamp generated by the AD 120 indicating when the AD 120 received or processed the packet(s).

The CPSRG 140, in some embodiments of the invention, receives the alert package(s) 124 from the AD 120 (and perhaps other alert packages 124 from the same AD 120 or other ADs), over a wired or wireless network interface. In alternate embodiments, though, the CPSRG 140 may be a module executing on a same computing device as part of the AD 120 itself, and thus the alert packages 124 may be transferred between the CPSRG 140 and the AD 120 using a bus, shared memory space, etc. Accordingly, each of the HTTP clients 110, the AD 120, the web application servers 130, and the CPSRG 140 may be implemented in software and/or hardware running on the same or separate machines (also referred to as electronic devices).

In one embodiment, the CPSRG 140 operates on a "batch" of one or more alert packages 124 generated in response to the triggering of an initial set of security rules 146A with an initial set of attribute values to attempt to automatically generate 141 a set of one or more collection rules 145 or attribute values 149 that can be used by the AD 120 to generate collection rules. The collection rules collect additional information related to traffic in collection packages 128, in addition to the information collected by security rules in alert packages 124. The collection packages 128 are used by the CPSRG 140 for analysis and the possible generation of new security rules 146B. The collection rules are to effectively aggregate from across security rules types to broaden the view of traffic such that more traffic is sent to the CPSRG 140 for analysis.

In some embodiments, the logic of the CPSRG 140 relies on rule types, including security rule types and/or collection rule types. For each rule type, there is a definition to control the CPSRG 140 to dynamically generate the collection rule(s) based on the alert packages 124, analyze any collection package 128 sent responsive to the triggering of the generated collection rules, and dynamically generate new security rules 146B. This definition includes those parts of the collection rules that are preconfigured (these parts can be collectively referred to as the collection rule template), as opposed to the attributes values which are dynamically determined responsive to the receipt of the alert packages 124 sent due to the triggering of the existing security rules 146A. If a collection rule is thought of in terms of having a rule identifier, a rule condition (which includes detection logic, attribute identifier(s), attribute value(s), and operations), and action(s), the parts of the collection rules that are dynamically generated are the attribute values for the attribute identifiers. The action(s) for the collection rules, when triggered, include the sending of collection packages to the CPSRG 140 (without interfering/blocking the traffic and, in some embodiments, without providing any feedback to the customer). Thus, collection rules are similar to security rules in the way they inspect traffic, but in some embodiments, the collection rules are not visible to customers.

If the new set of attribute values is not empty (that is, the CPSRG 140 was able to successfully automatically generate a new set of attribute values for each of a set of attribute identifiers of a collection rule template), the CPSRG 140 will cause the AD 120 to apply the collection rules so that the AD 120 will collect additional traffic. This can include distributing 142 the new set of attribute values 149 or collection rules 145 with the attribute values to the AD 120 (and possibly other ADs).

When the AD 120 receives traffic (e.g., packets) carrying web application layer messages 160A-160B, in addition to applying security rules, the AD 120 applies collection rules by determining whether any of the conditions of the collection rules are satisfied for the packets (also referred to as the triggering of collection rules) such that analysis can be performed on this subset of traffic. When a condition of a collection rule that analyzes web application layer request messages 160A-160B for potential additional analysis is met, the AD 120 sends (see block 126) a collection package 128 to the CPSRG 140. The collection package 128 includes part or all the web application layer messages 160A-160B themselves; and may additionally include, depending upon the embodiment of the invention, a variety of types of information related to the web application layer messages 160A-160B, including but not limited to "packet parts" that include information from packet headers of the packet(s) carrying the web application layer messages 160A-160B that meet the rule condition (e.g., source or destination IP addresses from an IP header, source or destination ports from a TCP header or UDP header, a MAC address or VLAN identifier value from an Ethernet header, etc.), an identifier of the matched collection rule having the condition met, part or all of the condition of the matched collection rule, a category/type of the matched collection rule, a set of violation indicators describing other flaws or departures from proper protocol found in the packets, and/or a timestamp generated by the AD 120 indicating when the AD 120 received or processed the packet(s).

In response to receipt of collection packages, the CPSRG 140 attempts to generate 143 new security rules. In particular, for each collection rule type, the definition associated with the collection rule type also controls the logic to analyze the collection packages 128 sent due to the triggering of collection rules of that collection rule type and to generate new security rules 146B. In some embodiments, this includes deciding if that security rule 146B already exists; and if the new security rule 146B already exists, drop the new security rule 146B. Like collection rules, the definition for each collection rule type includes those parts of the new security rules 146B that are preconfigured (these parts can be collectively referred to as the security rule template), but the attributes values are dynamically determined responsive to the receipt of the collection packages. If a security rule is thought of in terms of having a rule identifier, a rule condition (which includes detection logic, attribute identifiers, attribute values, and operations), and action(s), the parts of the security rules that are dynamically generated are the attribute values.

The new security rules 146B may differ from previously existing triggered security rules 146A in a variety of ways, including pertaining to a different attack type, utilizing a different action, utilizing a different attribute identifier, and/or utilizing a different attribute value. Accordingly, this automatic generation 143, by the CPSRG 140, of the new set of attribute values can enable the AD 120 to use a different security rule to specifically defend against unknown web application layer attacks, without any human intervention, and without a large vulnerability window that would allow the attack to continue to affect the set of web application servers 130. Similarly, in certain embodiments, this automatic generation 143 can enable the AD 120 to use a different security rule that is attacker specific (i.e., a set of security rules that target all attack types from a single attacker) to further analyze web application layer request messages of an attacker via collection rules to ultimately learn new sets of attribute values that identify additional unknown web application layer attacks for other attack specific security rules.

Thus, the attribute values are automatically generated based on monitored web application layer request messages. These automatically generated attribute values may be distributed 144 to some or all of the set of ADs protecting the one or more web applications, and further may be automatically provided to other, non-related ADs to protect other web applications from web application level attacks. Additionally, the automatically generated new set of attribute values may be distributed to other computing devices of other organizations for further use outside of the immediate community of ADs. For example, when the attribute values 152 and/or rules 150 identify a source of web attacks (i.e., are attacker-specific attribute values) or packets for additional analysis, this source information can be transmitted to computing devices of search engines and/or security services that rank or identify the potential threat posed by specific hosts. Further, the attribute values 152 and/or rules 150 may be used to notify Internet Service Providers (ISPs) that provide network services to the attackers about the malicious activity or need for additional analysis or used to notify the owners or operators of individual end stations that their devices may be compromised and are being used to perform web application attacks.

Although described above as the use of collection rules 145 and resulting collection packages 128 for automated generation of new security rules 145B, in some embodiments, the CPSRG 140 may offer semi-automated services for the generation of new security rules 145B. For example, the CPSRG 140 may transmit or otherwise provide to an administrator or user of the AD 120 one or more of (1) the collection rules 145, (2) attribute values 148 that may be used for generating new security rules 145B, and/or (3) suggested new security rules 145B. Based on these pieces of information, the administrator/user of the AD 120 may (1) be provided with additional insights as to the traffic (e.g., the collection rules 145 provide collection packages 128 that capture traffic in addition to the traffic captured by the initial set of security rules 146A) and/or (2) decide to add new security rules 145B for use by the AD 120. For example, in response to receipt of the new security rules 145B, the AD 120 or another device of the administrator/user may present the new security rules 145B as suggestions to the administrator/user. The administrator/user may select which (if any) of the new security rules 145B to use by the AD 120. In another example, the collection packages 128 may be presented to the administrator/user of the AD 120 as attack analytics. In response to these attack analytics, an administrator/user of the AD 120 may trigger the CPSRG 140 to generate (1) attribute values 148, which may be used by the AD 120 for generating new security rules 145B, and/or (2) new security rules 145B. Accordingly, the generation of new security rules 145B and use by the AD 120 of new security rules 145B may be fully automated or partially automated based on input from an administrator/user of the AD 120. As a result, sending 126 collection packages 128 to the CPSRG 140, attempting to generate 143 new security rules 146B and/or causing 144 the AD 120 to apply the new security rules 146B may be optional at the discretion of the AD 120.

Figure 2:
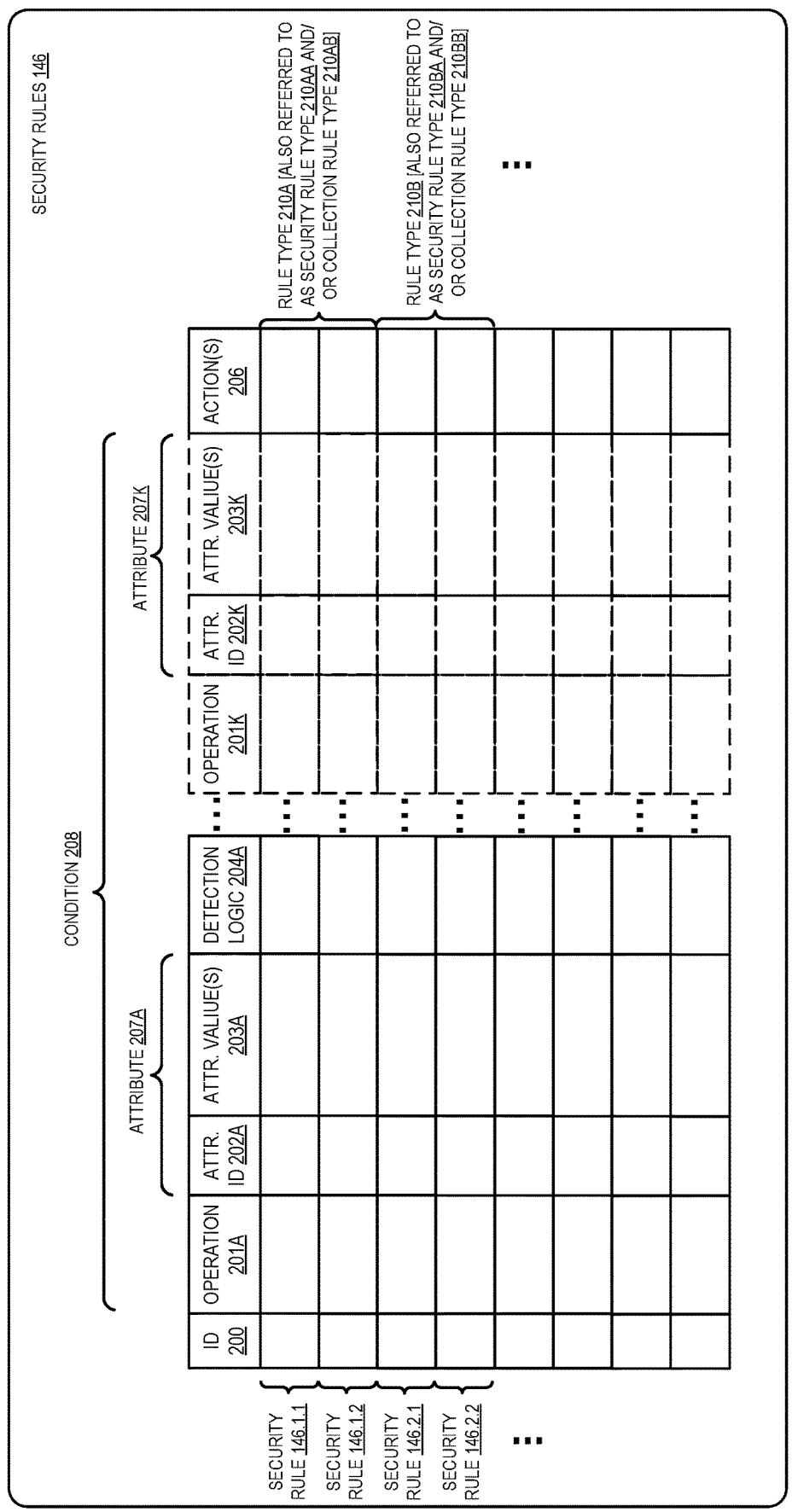
FIG. 2 is a diagram illustrating aspects of security rules for detecting attacks of certain attack types, according to certain embodiments of the invention.

FIG. 2 is a diagram illustrating aspects of security rules 146 for detecting attacks of certain attack types, according to certain embodiments of the invention. In FIG. 2, a set of initial security rules 146A, including the security rules 146.1.1, 146.1.2, 146.2.1, and 146.2.2 are illustrated that can be utilized in the AD 120 or another type of module for examining traffic (e.g., packets). While each security rule 146 may be implemented in a variety of ways, the security rules 146 are conceptually presented herein as including several distinct aspects. First, each security rule 146 includes a rule identifier 200, which serves to uniquely identify a particular security rule 146. Each rule identifier 200 can be a unique set of bits or characters serving as a "key" to the set of security rules 146, and in many systems the rule identifiers 200 are integer values, string values (sets of one or more characters), or even combinations of other aspects of the security rules 146. In some systems, however, an explicit rule identifier 200 is not necessary.

The set of security rules 146 also includes a condition 208 that defines what to look for in traffic, and a set of one or more actions 206 to be performed when a condition 208 is met. The condition 208 includes, for each security rule 146, one or more attributes 207 (e.g., attributes 207A-207K). An attribute 207 is a combination of an attribute identifier 202 and a set of one or more attribute values 203. For example, attribute 207A includes attribute identifier 202A and attribute value(s) 203A, while the attribute 207K includes the attribute identifier 202K and attribute value(s) 203K. An attribute identifier 202 serves to identify an attribute in the traffic (e.g., within packets) to be examined and attribute values 203 are values for identified attributes. Attribute identifiers 202 can identify particular protocol headers (e.g., a TCP header, an HTTP header) and/or header fields (e.g., a source or destination port of a TCP header, a Referrer HTTP header field) used within a packet. Attribute identifiers 202 can also identify metrics or characteristics of traffic that an attribute value 203 represents. For example, an attribute identifier 202 may be a number of packets or HTTP messages received over a defined period of time, and the corresponding attribute value 203 may be that particular number of packets or HTTP messages. Of course, the use of metrics or characteristics as attribute identifiers 202 requires that the system have some way of determining the attribute values 203, perhaps by maintaining a separate table or database (not pictured) with relevant data necessary to perform the computation. Attribute identifiers 202 may also identify portions of application layer data carried by packets, such as an HTTP request message, an HTTP response message, a SQL query, etc. Each attribute 207 may also be associated with an operation 201 that indicates how values will be compared in relation to the attribute value(s) 203 to assist in determining if the condition 208 has been met. For example, an operation 201 may be a Boolean logic function (e.g., only one of the attribute values 203 must be found, all of the attribute values 203 must be found, or none of the attribute values 203 must be found) or a fuzzy logic function. In some systems, each security rule 146 may also include sets of detection logic 204 describing how attributes 207 are to be used in relation to each other to determine if the condition 208 has been met (e.g., a first identifier-value pair must be true in relation to a value associated with a packet AND a second identifier-value pair must be true in relation to a value associated with a packet, a first identifier-value pair must be true in relation to a value associated with a packet OR a second identifier-value pair must be true in relation to a value associated with a packet, etc.). In some systems, the detection logic 204 instead defines how to find the portions of the traffic identified by the attribute identifiers 202. In some systems, the detection logic 204 and attributes 207 (including attribute identifiers 202 and associated attribute values 203) are combined into fewer fields.

Each of the security rules 146 is also depicted as including one or more protective actions 206 to be performed when the condition 208 of the security rule 146 is satisfied. Protective actions 206 can indicate the generation of an alert, one or more forwarding actions (e.g., drop the packet or message, temporarily hold the packet or message for further analysis, transmit the packet or message to a particular module or IP address, forward the packet or message to the intended destination, etc.), and/or modification actions (e.g., insert a value into the packet or message at a particular location, strip out a value from the packet or message, replace a value in the packet or message, etc.). The actions 206 can also include instructions describing what information is to be placed into each alert package 124; for example, an action 206 may direct that an attack type indication of "RFI attack" is to be included therein.

In some systems, the security rules 146 utilized by computing devices for security purposes may be described as detecting a particular type of attack and thus have an attack/rule type 210. For example, security rules 146.1.1 and 146.1.2 may detect SQLi attacks and be of a SQLi attack type (i.e., rule type 210A, which includes security rule type 210AA and/or collection rule type 210AB) and security rules 146.2.1 and 146.2.2 may detect RFI attacks and be of an RFI attack type (i.e., rule type 210B, which includes security rule type 210BA and/or collection rule type 210BB).

Figure 3:
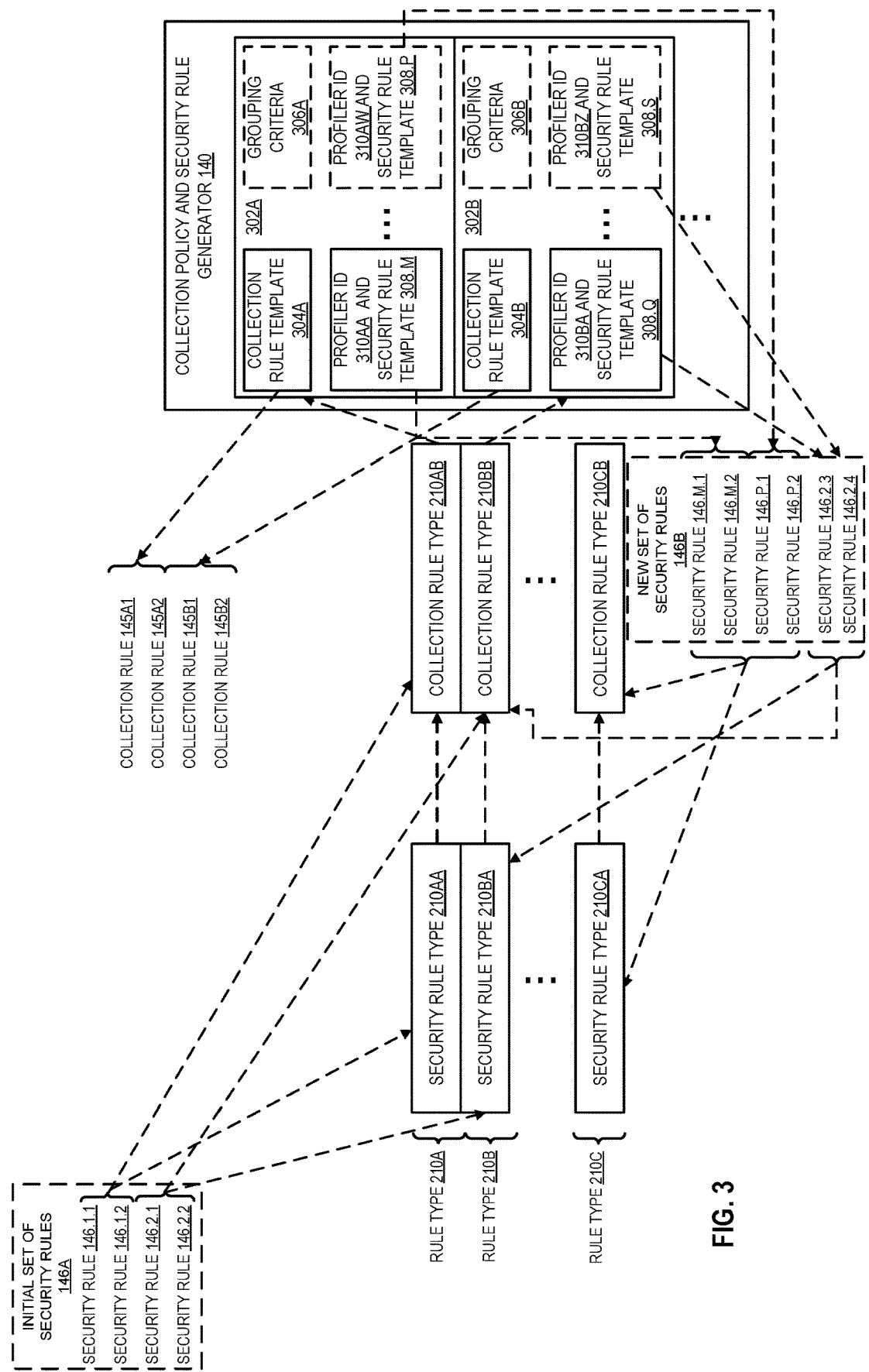
FIG. 3 is a block diagram illustrating the relationships between security rules; rule types, including security rule types and collection rule types; collection rules; and collection/security rule generation data, according to certain embodiments of the invention.

FIG. 3 is a block diagram illustrating the relationships between security rules 146; rule types 210, including security rule types and collection rule types; collection rules 145; and collection/security rule generation data 302 (also referred to as definitions to control the CPSRG 140 to dynamically generate security rules and/or collection rules), according to certain embodiments of the invention. Security rules 146 are associated with the same rule type 210, including security rule type, when the security rules 146 seek to identify or target the same type of attack and/or the same attacker. In the example represented in FIG. 3, the security rules 146.1.1 and 146.1.2 are of the same rule type 210A, including the same security rule type 210AA. Thus, the security rules 146.1.1 and 146.1.2 identify or target the same type of attack and/or the same attacker. For example, the security rules 146.1.1 and 146.1.2 may both identify or target CSRF attacks. Similarly, the security rules 146.2.1 and 146.2.2 are of the same rule type 210B, including the same security rule type 210BA. Thus, the security rules 146.2.1 and 146.2.2 both identify or target the same type of attack and/or the same attacker. For example, both the security rules 146.2.1 and 146.2.2 identify or target SQLi attacks.

Security rules 146 are further or alternatively mapped to collection rule types. For example, the security rules 146.1.1 and 146.1.2 are mapped to the collection rule type 210AB. This mapping of security rules 146 to collection rule types extends to alert packages 124 generated in response to conditions 208 being met for corresponding security rules 146. For instance, alert packages 124, which are generated in response to conditions 208 of the security rules 146.1.1 and 146.1.2 are mapped to collection rule type 210AB based on the mapping of the security rules 146.1.1 and 146.1.2 to the collection rule type 210AB. Similarly, alert packages 124, which are generated in response to conditions 208 of the security rules 146.2.1 and 146.2.2 are mapped to collection rule type 210BB based on the mapping of the security rules 146.2.1 and 146.2.2 to the collection rule type 210BB.

For each rule type 210 (and thus collection rule type), there is collection/security rule generation data 302: 1) that defines how to generate collection rules 145 from alert packages 124 that are generated responsive to the triggering of security rules 146A determined to belong to that rule type; and 2) that defines how to generate new security rules 146B (i.e., security rules 146B that include at least one difference from existing security rules 146B, which were originally triggered (e.g., a different attribute identifier 202, attribute value 203, etc.)) from collection packages 128 that are generated responsive to the triggering of collection rules 145 of that rule type. For example, the collection/security rule generation data 302, which defines how to generate collection rules 145 from alert packages 124, may include 1) a collection rule template 304, which identifies attributes identifiers, but not the attribute values for collection rules 145 that will be generated using the collection rule template 304; and 2) in some embodiments, grouping criteria 306 of how to group alert packages 124 based on similarities (or identity) between alert packages 124. For example, the grouping criteria 306A for the collection rule type 210AB may indicate an attribute identifier (e.g., an IP address attribute identifier) for alert packages 124 to be grouped based on similarities (or identity) of attribute values for this attribute identifier. Using these groups of alert packages 124, a collection rule template 304 is applied. In contrast, the grouping criteria 306B for the collection rule type 210BB may indicate a different attribute identifier (e.g., a Domain attribute identifier) for alert packages 124 to be grouped based on similarities (or identity) of attribute values for this attribute identifier. In embodiments that lack grouping criteria 306 for one or all of the rule types 210, the alert packages of that rule type 210 are treated as a single group.

Figure 4:
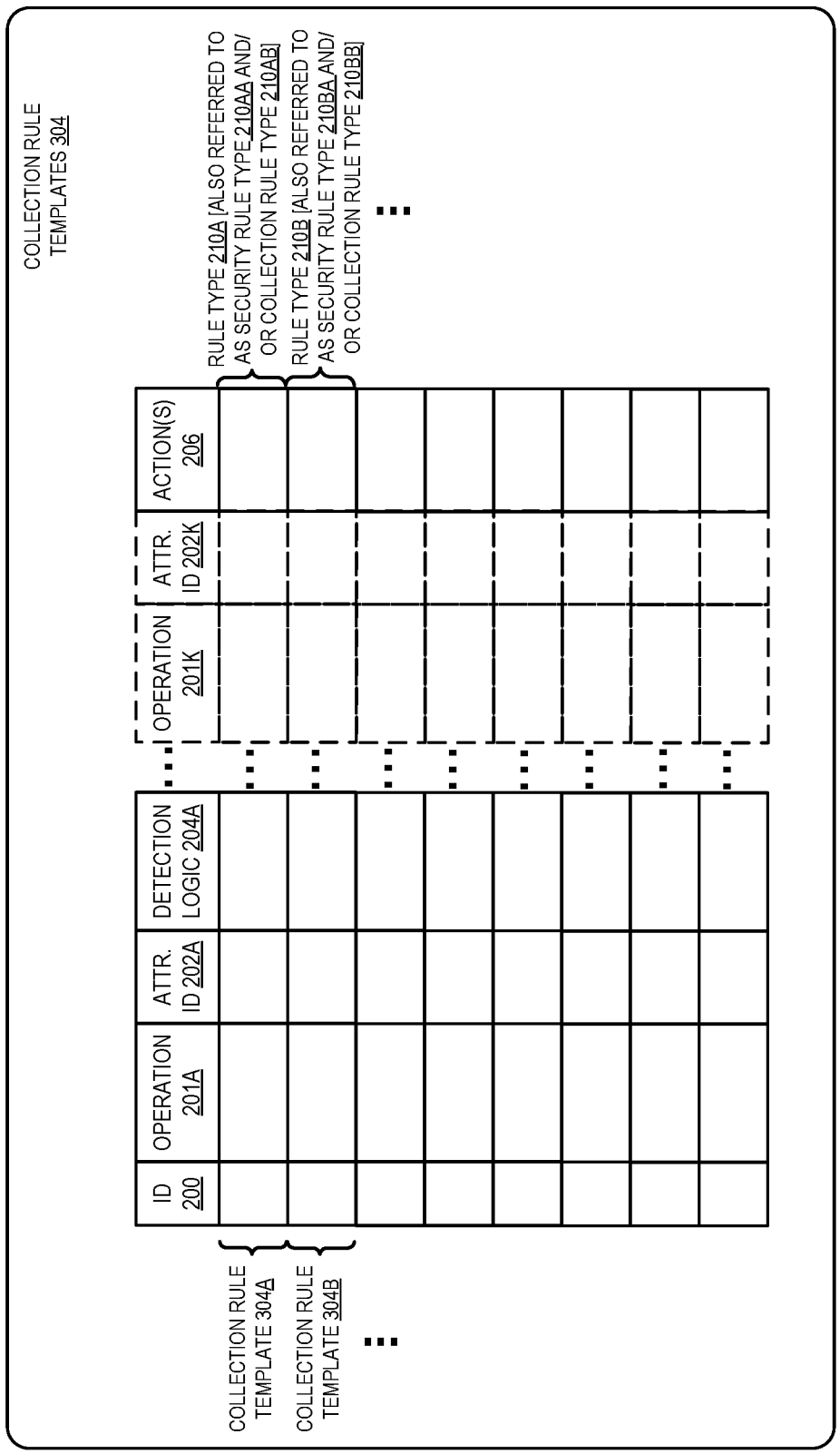
FIG. 4 is a diagram illustrating aspects of collection rule templates for generating collection rules, according to certain embodiments of the invention.

As noted above, a collection rule template 304 includes all the data of a collection rule 145 apart from attribute values 203. For example, FIG. 4 is a diagram illustrating aspects of collection rule templates 304 for generating collection rules 145, according to certain embodiments of the invention. As shown in FIG. 4, collection rule templates 304A and 304B, which are respectively part of collection/security rule generation data 302A and 302B, each include a rule identifier 200, which serves to uniquely identify a particular collection rule template 304, a set of operations 201A-201K, a set of attributes identifiers 202A-202K, a set of detection logic 204A, and a set of actions 206. Each collection rule template 304 is associated with a rule type 210A/210B for use in mapping to alert packages 124. Using the groups of alert packages 124, which were generated based on the grouping criteria 306, attribute identifier-value signatures, including one or more attribute identifier-value pairs, are determined for the collection rule template 304 and form the basis of a collection rule 145. In particular, the attribute values of alert packages 124 in each group are used to determine attribute identifier-value pairs, which correspond to the attribute identifiers 202 of a collection rule template 304. The attribute identifier-value pairs together with a collection rule template 304 form a collection rule 145. For example, FIG. 5 is a diagram illustrating aspects of collection rules 145 for generating collection packages 128, according to certain embodiments of the invention.

Figure 5:
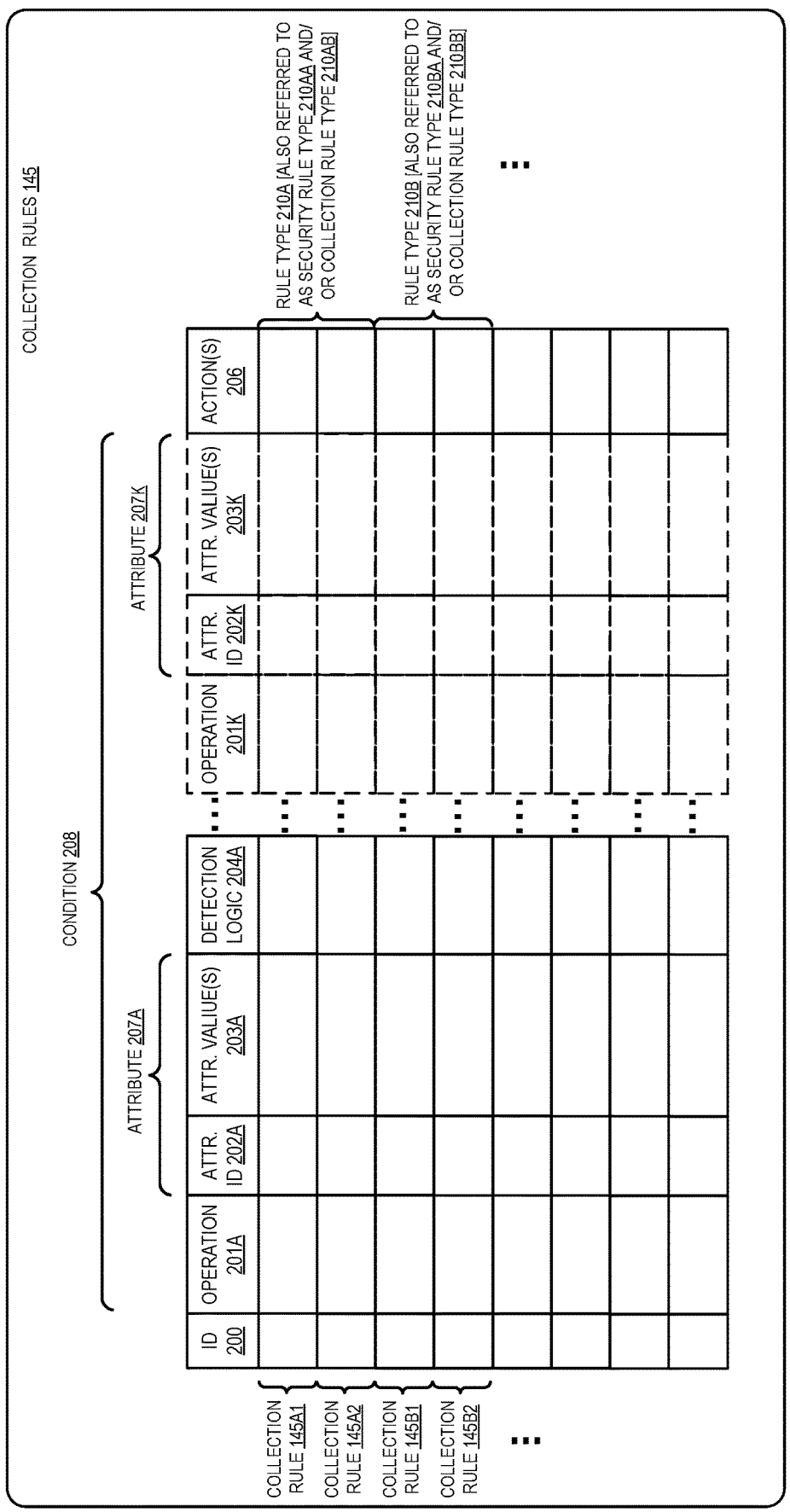
FIG. 5 is a diagram illustrating aspects of collection rules for generating collection packages, according to certain embodiments of the invention.

As shown in FIG. 5, the collection rules 145A1, 145A2, 145B1, and 145B2 include all the elements of collection rule templates 304 along with attribute values 203. In particular, the collection rules 145 each include: 1) an identifier 200; 2) a condition 208, which includes a set of attributes 207A-207K with corresponding operations 201A-201K (e.g., a Boolean logic function or a fuzzy logic function) and a set of detection logic 204 describing how attributes 207 are to be used in relation to each other to determine if the condition 208 has been met; and 3) actions 206 to be performed in response to the condition 208 being met (e.g., generate a collection package 128 for further analysis by the CPSRG 140). As shown, each attribute 207 includes an attribute identifier 202, which is based on a collection rule template 304, and a corresponding attribute value 203, which was determined from the alert packages 124.

Responsive to a new collection rule 145 or attribute values 149 for a collection rule being generated, they are provided to the AD 120 to be applied as previously described with reference to FIG. 1. Upon a condition 208 of a collection rule 145 being met, collection packages 128 are generated. As noted above, the collection/security rule generation data 302 includes data that defines how to generate new security rules 146B from collection packages 128 that are generated responsive to the triggering of collection rules 145 of that rule type. This data can include one or more combinations of: a) a profiler identifier 310, which corresponds to a profiler used to process collection packages 128 to produce a result (i.e., an attribute identifier-value signature); and b) a security rule template 308. In operation, responsive to receiving collection packages 128 generated due to the triggering of one or more collection rules 145, the collection packages 128 are grouped by collection rule type. For a collection rule type, the set of one or more profilers 310 identified for that collection rule type are applied to the collection packages 128 to produce corresponding attribute identifier-value signatures. Each of the attribute identifier-value signatures generated by profilers 310 are used to populate the security rule template 308 identified for that profiler 310 to produce a new security rule 146B.

Figure 6:
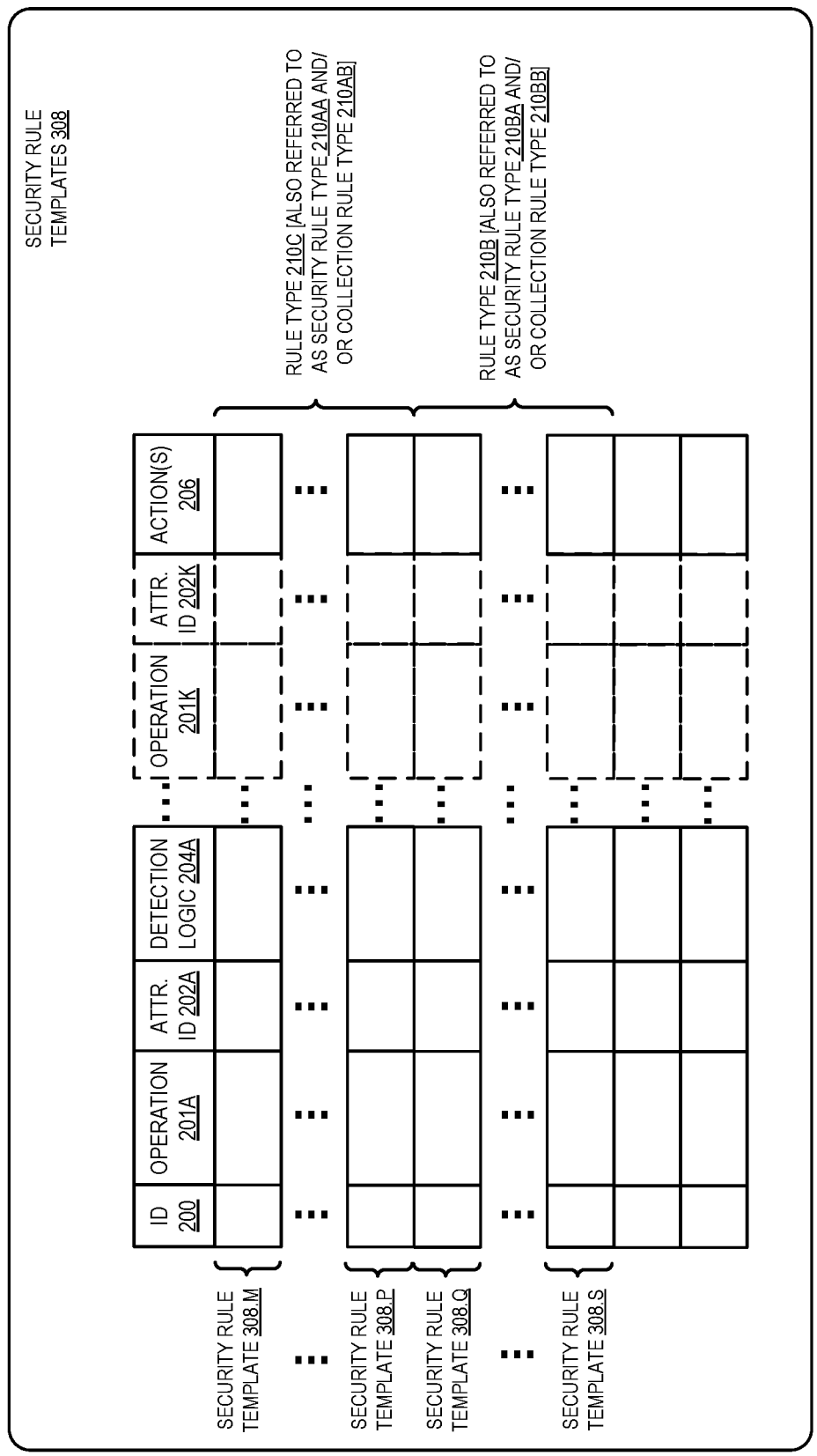
FIG. 6 is a diagram illustrating aspects of security rule templates for generating security rules, according to certain embodiments of the invention.

For example, FIG. 6 is a diagram illustrating aspects of security rule templates 308 for generating security rules 146B, according to certain embodiments of the invention. As shown in FIG. 6, security rule templates 308.M-308.P and 308.Q-308.S, which are respectively part of collection/security rule generation data 302A and 302B, each include a rule identifier 200, which serves to uniquely identify a particular security rule template 308, a set of operations 201A-201K, a set of attributes identifiers 202A-202K, a set of detection logic 204A, and a set of actions 206. Each security rule template 308 is associated with a rule type 210C/210B. Using attribute identifier-value signatures generated by corresponding profilers 310, new security rules 146B are generated using a corresponding security rule template 308. For example, the security rules 146.M.1 and 146.M.2 are generated based on the profiler 310AA and security rule template 308.M; the security rules 146.P.1 and 146.P.2 are generated based on the profiler 310AW and security rule template 308.P; the security rule 146.2.3 is generated based on the profiler 310BA and security rule template 308.Q; and the security rule 146.2.4 is generated based on the profiler 310BZ and security rule template 308.S. Each of the new security rules 146 may be of the same rule type as a corresponding collection rule 145 or of a different rule type. For example, security rules 146.M.1 and 146.M.2 were generated based on the collection rules 145 of rule type 210A and security rule type 210AA, but themselves are of rule type 210C and security rule type 210CA. Similarly, security rules 146.P.1 and 146.P.2 were generated based on the collection rules 145 of rule type 210A and security rule type 210AA, but themselves are of rule type 210C and security rule type 210CA. In contrast, security rules 146.2.3 and 146.2.4 were generated based on the collection rules 145 of rule type 210B and security rule type 210BA and are themselves are of rule type 210B and security rule type 210BA.

Figure 7A:
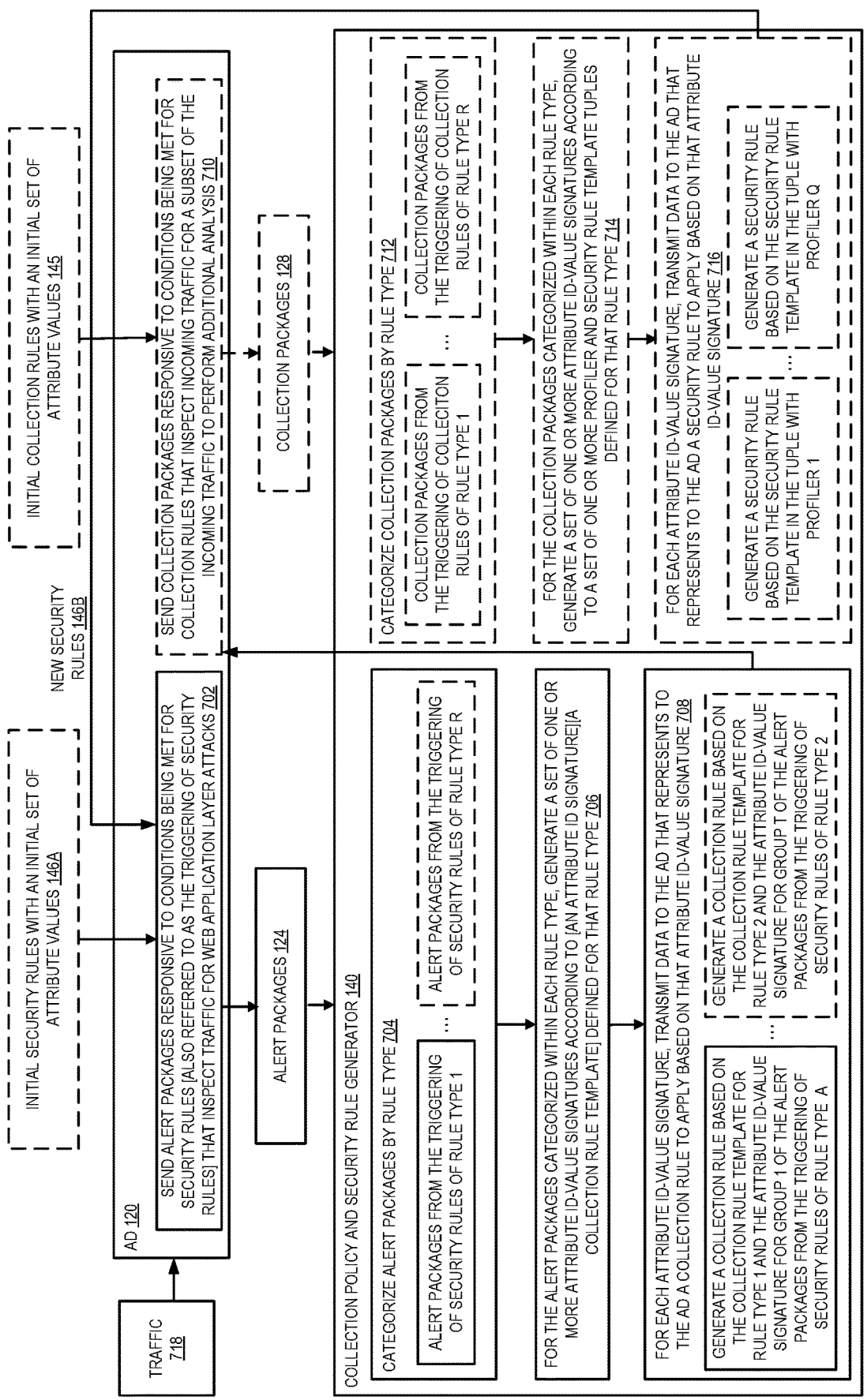
FIG. 7A is both a block and a flow diagram illustrating a technique for automatically generating security rules based on (1) current security rules with corresponding generated alert packages and (2) collection rules with corresponding generated collection packages, according to certain embodiments of the invention.

FIG. 7A is both a block and a flow diagram illustrating a technique for automatically generating new security rules 146B based on collection packages 128 generated responsive to the triggering of collection rules 145, according to certain embodiments of the invention. As shown in the example of FIG. 7A, the AD 120 receives an initial set of security rules 146, which each include an initial set of attribute values and inspect the traffic 718 for web application layer attacks. For example, referring back to FIG. 3, the initial set of security rules 146 may be the security rules 146.1.1, 146.1.2, 146.2.1, and 146.2.2. Although described as utilizing an initial set of security rules 146A to generate collection rules 145, which are thereafter used to generate new security rules 146B (as will be described in greater detail below), in some embodiments, the AD 120 may additionally or alternatively begin with an initial set of collection rules 145, which are used to generate security rules 146B. However, FIG. 7A will be described in relation to beginning with an initial set of security rules 146A for purposes of illustration.

The AD 120 applies the initial set of security rules 146A to the traffic 718, which may be received from the HTTP clients 110. Accordingly, the traffic 718 includes web application layer messages 160A (e.g., that are each carried by one or more packets). When the traffic 718 (e.g., one or more web application layer messages 160A) meets a condition 208 of a security rule 146A (also referred to as triggering a security rule 146A), the AD 120 generates and sends at block 702 a set of one or more alert packages 124 to the CPSRG 140.

In response to receipt of the set of one or more alert packages 124 from the AD 120, the CPSRG 140 categorizes alert packages 124 by a rule type at block 704. In particular, each security rule 146 is mapped to a rule type, including a security rule type and a collection rule type. For example, the security rules 146.1.1 and 146.1.2 are mapped to the rule type 210A, including the security rule type 210AA and the collection rule type 210AB, while the security rules 146.2.1 and 146.2.2 are mapped to the rule type 210B, including the security rule type 210BA and the collection rule type 210BB. Security rules 146 that are mapped to the same rule type or security rule type target the same type of attack and/or the same attacker. In this example, alert packages 124 generated in response to conditions 208 for the security rules 146.1.1 and 146.1.2 being met are categorized into the same group as they are mapped to the same rule type (e.g., the rule type 201A, including the security rule type 210AA and the collection rule type 210AB). Similarly, alert packages 124 generated in response to conditions 208 for the security rules 146.2.1 and 146.2.2 being met are categorized into the same group as they are mapped to the same rule type (e.g., the rule type 201B, including the security rule type 210BA and the collection rule type 210BB). As shown in FIG. 7A, alert packages 124 are grouped into R groups. For example, assuming fifteen alert packages 124 are received, the CPSRG 140 may determine that five of them are of rule type 210A (e.g., generated in response to conditions 208 for the security rules 146.1.1 or 146.1.2) and ten are of rule type 210B (e.g., generated in response to conditions 208 for the security rules 146.2.1 and 146.2.2).

Following categorization of alert packages 124, the CPSRG 140 generates at block 706 attribute-identifier value signatures for alert packages 124 categorized within each rule type 210 based on one or more of an attribute-identifier signature and a collection rule template defined for that rule type 210.

In response to generating one or more attribute identifier-value signatures, data is transmitted at block 708 by the CPSRG 140 to the AD 120 that represents to the AD 120 a collection rule to apply based on that attribute ID-value signature. For example, the CPSRG 140 may use each of the attribute identifier-value signatures and corresponding collection rule templates 304 to generate a collection rule 145. In particular, the attribute values of attribute identifier-value pairs are used for attribute identifiers 202 of collection rule templates 304 to generate collection rules 145. In this example, the collection rules 145 generated using attribute identifier-value pairs are transmitted to the AD 120. Alternatively, the CPSRG 140 may transmit the attribute identifier-value pairs to the AD 120 such that the AD 120 may generate collection rules 145.

In response to receipt of data that represents to the AD 120 collection rules 145 to apply, the AD 120 applies these new collection rules 145. While FIG. 7A illustrates the case where the system starts from initial security rules 146A, embodiments may additionally or alternatively start from initial collection rules 145 with an initial set of attribute values, which may pre-exist receipt of the data representing new collection rules 145. The AD 120 applies collection rules 145 to the traffic 718 from the HTTP clients 110. As noted above, the traffic 718 includes web application layer messages 160A (e.g., that are each carried by one or more packets). When the traffic 718 (e.g., one or more web application layer messages 160A) meets a condition 208 of a collection rule 145 (also referred to as triggering a collection rule 145), the AD 120 generates and sends at block 710 a set of one or more collection packages 128 to the CPSRG 140.

In response to receipt of the set of one or more collection packages 128 from the AD 120, the CPSRG 140 categorizes at block 712 collection packages 128 by a rule type. In particular, each collection rule 145 is mapped to a rule type, including a collection rule type. For example, the collection rules 145A1 and 145A2 are mapped to the rule type 210A, including the collection rule type 210AB, while the collection rules 145B1 and 145B2 are mapped to the rule type 210B, including the collection rule type 210BB. In this example, collection packages 128 generated in response to conditions 208 for the collection rules 145A1 and 145A2 being met are categorized into the same group since they are mapped to the same rule type (e.g., the rule type 201A, including the collection rule type 210AB). Similarly, collection packages 128 generated in response to conditions 208 for the collection rules 145B1 and 145B2 being met are categorized into the same group as they are mapped to the same rule type (e.g., the rule type 201B, including the collection rule type 210BB).

For collection packages categorized within each rule type, the CPSRG 140 generates at block 714 a set of one or more attribute identifier-value signatures according to a set of one or more profilers 310 and security rule template 308 tuples defined for that rule type.

In response to generating one or more attribute identifier-value signatures, data is transmitted at block 716 by the CPSRG 140 to the AD 120 that represents to the AD 120 a new security rule 146B to apply based on that attribute identifier-value signature. For example, the CPSRG 140 may use each of the one or more attribute identifier-value signatures and corresponding security rule templates 308 to generate a new security rule 146B. In particular, the attribute values of attribute identifier-value pairs are used for attribute identifiers 202 of security rule templates 308 to generate security rules 146B. In this example, the security rules 146B generated using attribute identifier-value pairs are transmitted to the AD 120. Alternatively, the CPSRG 140 may transmit the attribute identifier-value pairs to the AD 120 such that the AD 120 may generate new security rules 146B.

As noted above, although described above as the use of collection rules 145 and resulting collection packages 128 for automated generation of new security rules 145B, in some embodiments, the CPSRG 140 may offer semi-automated services for the generation of new security rules 145B. For example, the CPSRG 140 may transmit or otherwise provide to an administrator or user of the AD 120 one or more of (1) the collection rules 145, (2) attribute values 148 that may be used for generating new security rules 145B, and/or (3) suggested new security rules 145B. Based on these pieces of information, the administrator/user of the AD 120 may (1) be provided with additional insights as to the traffic (e.g., the collection rules 145 provide collection packages 128 that capture traffic in addition to the traffic captured by the initial set of security rules 146A) and/or (2) decide to add new security rules 145B for use by the AD 120. For example, in response to receipt of the new security rules 145B, the AD 120 or another device of the administrator/user may present the new security rules 145B as suggestions to the administrator/user. The administrator/user may select which (if any) of the new security rules 145B to use by the AD 120. In another example, the collection packages 128 may be presented to the administrator/user of the AD 120 as attack analytics. In response to these attack analytics, an administrator/user of the AD 120 may trigger the CPSRG 140 to generate (1) attribute values 148, which may be used by the AD 120 for generating new security rules 145B, and/or (2) new security rules 145B. Accordingly, the generation of new security rules 145B and use by the AD 120 may be fully automated or partially automated based on input from an administrator/user of the AD 120. As a result, categorizing 712 collection packages 128, generating 714 a set of one or more attribute identifier-value signatures, and/or transmitting 716 data to the CPSRG 140 may be optional at the discretion of the AD 120.

Figure 7B:
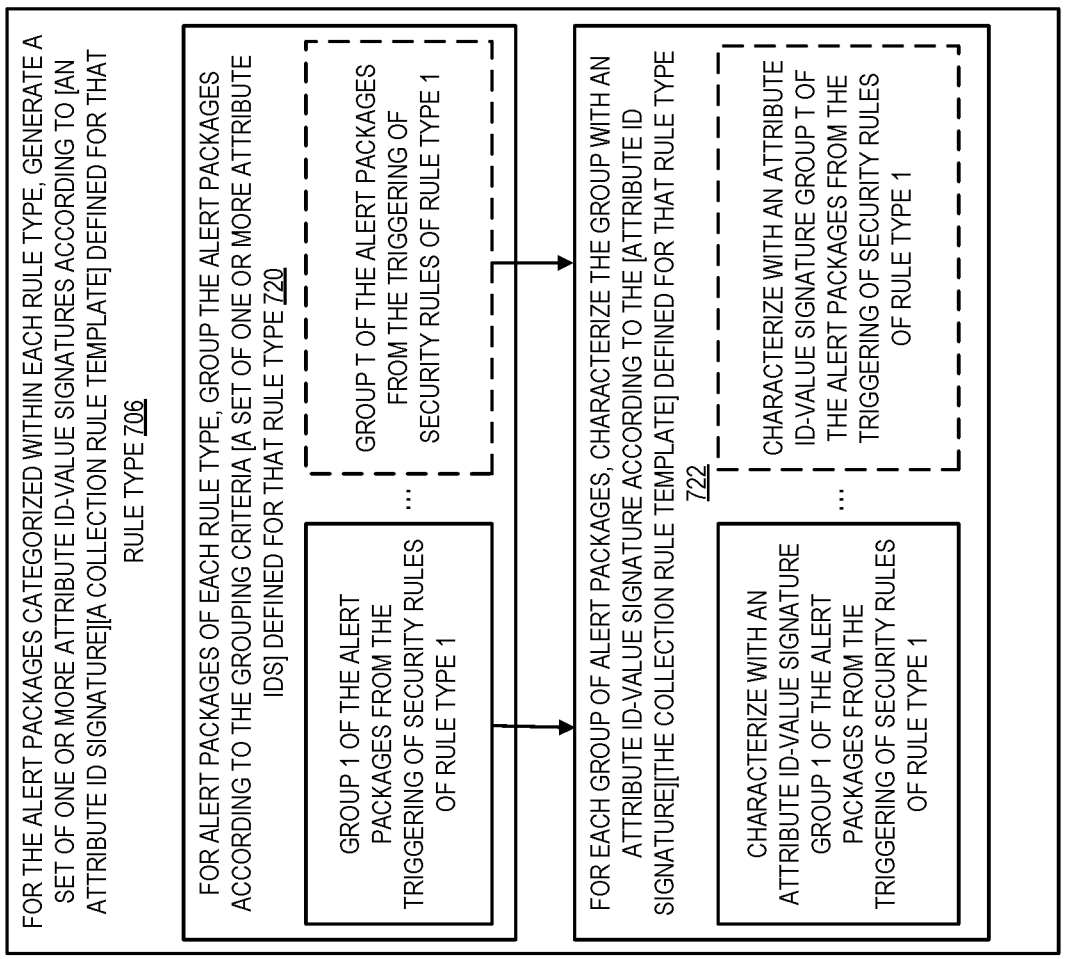
FIG. 7B shows a flow diagram for generating attribute-identifier value signatures for alert packages, according to certain embodiments of the invention.
Figure 7C:
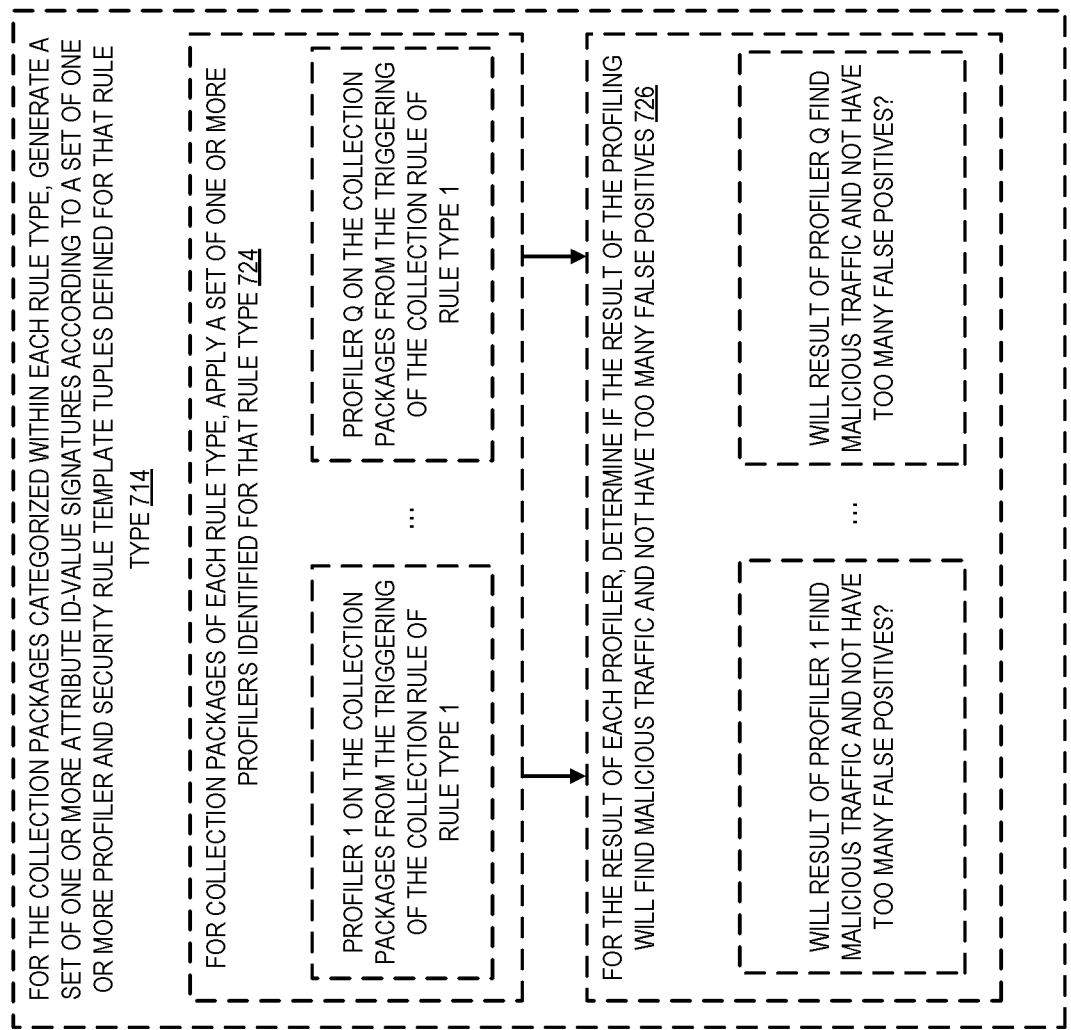
FIG. 7C shows a flow diagram for generating attribute identifier-value signatures for collection packages, according to certain embodiments of the invention.

Each of the operations of FIG. 7A may be performed using various techniques. FIGS. 7B and 7C shows additional details of some exemplary ways to perform operations of FIG. 7A. For example, FIG. 7B shows a flow diagram for generating attribute-identifier value signatures for alert packages 124 (block 706), according to certain embodiments of the invention.

As shown in FIG. 7B, for alert packages 124 of each rule type 210, the CPSRG 140 groups at block 720 the alert packages 124 according to grouping criteria (e.g., a set of one or more attribute identifiers) defined for that rule type. For example, the grouping criteria 306 associated with a collection rule type may indicate a set of one or more attribute identifiers 202. Alert packages 124 of each collection rule type are grouped based on similarities (or identity) between those alert packages 124 (e.g., based on the attribute values for one or more attributes identifiers). For example, grouping criteria 306A for the collection rule type 210AB may identify a URL attribute identifier 202. Accordingly, for alert packages 124 categorized within collection rule type 210AB that are directed to the same URL are grouped together.

For each group of alert packages 124, the CPSRG 140 characterizes at block 722 the group with an attribute identifier-value signature according to the attribute identifier signature defined for that rule type, which may be used with a collection rule template 304 defined for that rule type to generate a collection rule 145. The attribute identifier-value signature includes a set of one or more attribute identifier-value pairs (i.e., an attribute identifier and an attribute value shared by all alert packages 124 in a group of alert packages 124). For example, an attribute identifier-value pair may include an IP address attribute identifier and an attribute value of "1.2.3.4" while another attribute identifier-value pair may include a Domain Name attribute identifier and an attribute value of "ABC".

FIG. 7C shows a flow diagram for generating attribute identifier-value signatures for collection packages 128 (block 714), according to certain embodiments of the invention. As shown in FIG. 7C, for collection packages 128 of each rule type, the CPSRG 140 applies at block 724 a set of one or more profilers 310 identified for that rule type to generate a set of one or more attribute identifier-value signatures, including one or more attribute identifier-value pairs. The profilers 310 can be implemented in a variety of ways, including one or more of (1) detecting a set of attribute-value pairs, that are common to a significant part of the profiled traffic 718, (2) building a regular expression (or collection of regular expressions) that matches a significant part of the profiled traffic 718, and (3) detecting a string or collection of strings that exist in a significant part of the profiled traffic 718.

Thereafter, the CPSRG 140 may determine at block 726 if the set of one or more attribute identifier-value signatures generated by the profilers 310 will find malicious traffic and not have too many false positives (i.e., false positives above a threshold value). This can be done in a variety of ways, and either before or during the deployment of new security rules 146B. For example, in one embodiment, for each of the profilers 310, the CPSRG 140 isolates traffic matching the profilers 310 and estimates the risk involved in this traffic. This can be done using volume, density of events in time, sparsity of applications, etc. In another example embodiment, for each of the profilers 310, the CPSRG 140 estimates the chances to capture benign traffic (and thus generate false positives). This can be done either manually or automatically using a variety of techniques. For example, one embodiment uses a statistical algorithm that calculates the probability of false positives. A new security rule 146B may initially be applied with an action 206 that causes alert package 124 generation, but does not block the traffic. The statistical algorithm is applied to alert packages 124 generated responsive to the new security rule 146B being triggered. If application of the statistical algorithm on these alert packages 124 verifies that the new security rule 146B is above a certain threshold, the new security rule 146B is moved to an action 206 that blocks the traffic (e.g., by editing the action 206 of the new security rule 146B or by sending another security rule 146 with an action 206 that blocks the traffic).

Figure 8:
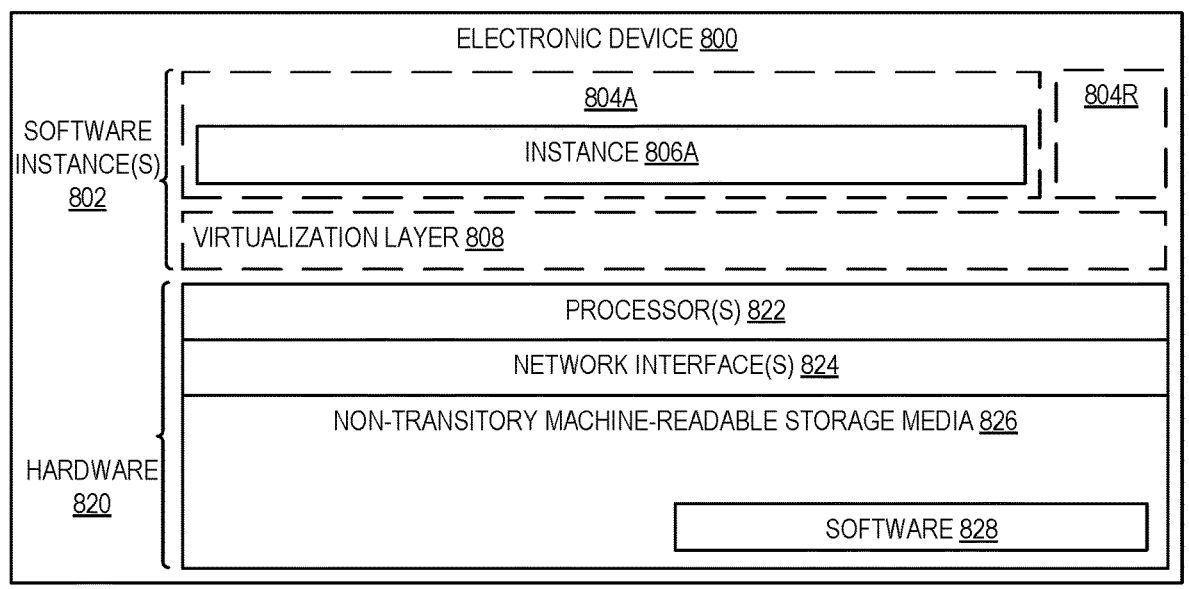
FIG. 8 is a block diagram illustrating an electronic device according to some example implementations.

FIG. 8 is a block diagram illustrating an electronic device, according to some embodiments. FIG. 8 includes hardware 820 comprising a set of one or more processor(s) 822, a set of one or more network interfaces 824 (wireless and/or wired), and non-transitory machine-readable storage media 826 having stored therein software 828 (which includes instructions executable by the set of one or more processor(s) 822). Software 828 can include code, which when executed by hardware 820, causes the electronic device 800 to perform operations of one or more embodiments described herein (e.g., the operations of one or more components of the security system 100).

In electronic devices that use compute virtualization, the set of one or more processor(s) 822 typically execute software to instantiate a virtualization layer 808 and software container(s) 804A-R (e.g., with operating system-level virtualization, the virtualization layer 808 represents the kernel of an operating system (or a shim executing on a base operating system) that allows for the creation of multiple software containers 804A-R (representing separate user space instances and also called virtualization engines, virtual private servers, or jails) that may each be used to execute a set of one or more applications; with full virtualization, the virtualization layer 808 represents a hypervisor (sometimes referred to as a virtual machine monitor (VMM)) or a hypervisor executing on top of a host operating system, and the software containers 804A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 828 (illustrated as instance 806A) is executed within the software container 804A on the virtualization layer 808. In electronic devices where compute virtualization is not used, the instance 806A on top of a host operating system is executed on the "bare metal" electronic device 800. The instantiation of the instance 806A, as well as the virtualization layer 808 and software containers 804A-R if implemented, are collectively referred to as software instance(s) 802.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory computer-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

Alternative Embodiments

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A set of one or more non-transitory machine-readable storage media storing instructions which, when executed by one or more processors of one or more computing devices cause the one or more computing devices to perform operations, wherein the one or more computing devices are coupled to a set of one or more web application layer attack detectors (ADs), wherein the set of ADs are communicatively coupled between a set of one or more Hypertext Transfer Protocol (HTTP) clients and a set of one or more web application servers to protect the set of web application servers against web application layer attacks, and wherein the set of ADs apply security rules that each comprise a condition, including a set of one or more attributes, wherein each of the set of attributes includes an attribute identifier and a set of one or more attribute values, the operations comprising:

receiving, from the set of ADs, a plurality of alert packages associated with a plurality of web application layer request messages sent by the set of HTTP clients to the set of web application servers, wherein each alert package was sent responsive to a respective one of the web application layer request messages in the plurality of web application layer request messages that resulted in the condition of one of the security rules being met, wherein each of the security rules further comprises a protective action to perform in response to the condition of the security rule being met;

generating a collection rule based on the plurality of alert packages, wherein the collection rule comprises a condition and an action to generate a collection package in response to the condition of the collection rule being met, wherein the condition includes an attribute value that was determined based on one or more of the plurality of alert packages;

causing the set of ADs to apply the collection rule so that the AD collects additional traffic on which to perform additional analysis; and receiving from at least one of the set of ADs a plurality of collection packages responsive to the condition of the collection rule being met by a subset of incoming traffic, wherein the condition of the collection rule being met does not result in performing a protective action.

2. The set of one or more non-transitory machine-readable storage media of claim 1, wherein the collection rule is generated further based on a collection rule template, which comprises a condition, including a set of one or more attribute identifiers, and wherein the generating the collection rule includes determining a set of attribute values, based on the plurality of alert packages, for the set of attribute identifiers of the collection rule template, wherein the collection rule includes the condition of the collection rule template and the set of attribute values generated based on the plurality of alert packages.

3. The set of one or more non-transitory machine-readable storage media of claim 2, wherein the operations further comprise:
generating a new security rule based on the collection packages, wherein the new security rule is generated further based on a security rule template, which comprises a condition, including a set of one or more attribute identifiers, and
wherein the generating the new security rule includes determining a set of attribute values, based on the plurality of collection packages, for the set of attribute identifiers of the security rule template,
wherein the new security rule includes the condition of the security rule template and the set of attribute values generated based on the plurality of collection packages.

4. The set of one or more non-transitory machine-readable storage media of claim 3, wherein each security rule in the set of security rules is associated with a rule type from a set of rule types, and wherein the operations further comprise:
categorizing the alert packages by the rule types to which the security rules whose conditions were met are associated,
wherein the collection rule is generated from a set of alert packages of a single rule type from the set of rule types and is associated with the single rule type.

5. The set of one or more non-transitory machine-readable storage media of claim 4, wherein the security rules in each rule type target a same web application layer attack of the web application layer attacks.

6. The set of one or more non-transitory machine-readable storage media of claim 1, wherein the alert packages include one or more of web application layer request message information, TCP layer information, IP layer information, information of the security rule whose condition was met, and a timestamp.

7. The set of one or more non-transitory machine-readable storage media of claim 1, wherein the web application layer request messages that trigger the security rule are identified as a web application layer attack from the web application layer attacks and the web application layer request messages that trigger the collection rule are identified for further analysis.

8. A computing device communicatively coupled to a set of one or more web application layer attack detectors (ADs), wherein the set of ADs are communicatively coupled between a set of one or more Hypertext Transfer Protocol (HTTP) clients and a set of one or more web application servers to protect the set of web application servers against web application layer attacks, and wherein the set of ADs apply security rules that each comprise a condition, including a set of one or more attributes, wherein each of the set of attributes includes an attribute identifier and a set of one or more attribute values, the computing device comprising:
one or more processors; and
a non-transitory machine-readable storage medium having instructions stored therein, which when executed by the one or more processors, causes the computing device to:
receive, from the set of ADs, a plurality of alert packages associated with a plurality of web application layer request messages sent by the set of HTTP clients to the set of web application servers, wherein each alert package was sent responsive to a respective one of the web application layer request messages in the plurality of web application layer request messages that resulted in the condition of one of the security rules being met, wherein each of the security rules further comprises a protective action to perform in response to the condition of the security rule being met;
generate a collection rule based on the plurality of alert packages, wherein the collection rule comprises a condition and an action to generate a collection package in response to the condition of the collection rule being met, wherein the condition includes an attribute value that was determined based on one or more of the plurality of alert packages;
cause the set of ADs to apply the collection rule so that the AD collects additional traffic on which to perform additional analysis; and
receive from at least one of the set of ADs a plurality of collection packages responsive to the condition of the collection rule being met by a subset of incoming traffic, wherein the condition of the collection rule being met does not result in performing a protective action.

9. The computing device of claim 8, wherein the instructions further cause the computing device to:
generate a new security rule based on the collection packages, wherein the collection rule is generated further based on a collection rule template, which comprises a condition, including a set of one or more attribute identifiers, and
wherein the generating the collection rule includes determining a set of attribute values, based on the plurality of alert packages, for the set of attribute identifiers of the collection rule template,
wherein the collection rule includes the condition of the collection rule template and the set of attribute values generated based on the plurality of alert packages.

10. The computing device of claim 9, wherein the new security rule is generated further based on a security rule template, which comprises a condition, including a set of one or more attribute identifiers, and
wherein the generating the new security rule includes determining a set of attribute values, based on the plurality of collection packages, for the set of attribute identifiers of the security rule template,
wherein the new security rule includes the condition of the security rule template and the set of attribute values generated based on the plurality of collection packages.

11. The computing device of claim 10, wherein each security rule in the set of security rules is associated with a rule type from a set of rule types, and where the instructions further cause the computing device to:
categorize the alert packages by the rule types to which the security rules whose conditions were met are associated,
wherein the collection rule is generated from a set of alert packages of a single rule type from the set of rule types and is associated with the single rule type.

12. The computing device of claim 11, wherein the security rules in each rule type target a same web application layer attack of the web application layer attacks.

13. The computing device of claim 8, wherein the alert packages include one or more of web application layer request message information, TCP layer information, IP layer information, information of the security rule whose condition was met, and a timestamp.

14. The computing device of claim 8, wherein the web application layer request messages that trigger the security rule are identified as a web application layer attack from the web application layer attacks and the web application layer request messages that trigger the collection rule are identified for further analysis.

15. A set of one or more non-transitory computer readable storage media storing instructions which, when executed by one or more processors of one or more computing devices cause the one or more computing devices to perform operations, wherein the one or more computing devices are coupled to a set of one or more web application layer attack detectors (ADs), wherein the set of ADs are communicatively coupled between a set of one or more Hypertext Transfer Protocol (HTTP) clients and a set of one or more web application servers to protect the set of web application servers against web application layer attacks, and wherein the set of ADs apply security rules that each comprise a condition, including a set of one or more attributes, wherein each of the set of attributes includes an attribute identifier and a set of one or more attribute values, the operations comprising:

receiving, from the set of ADs, a plurality of alert packages associated with a first set of web application layer request messages sent by the set of HTTP clients to the set of web application servers, wherein each alert package in the plurality of alert packages was sent responsive to a respective first set of one or more packets that collectively carried a respective web application layer request message in the first set of web application layer request messages and that resulted in the condition of one of the security rules being met, wherein each packet in the first set of packets is sent using a protocol stack including an application layer that carries the web application layer messages, a transport layer under the application layer to provide end-to-end communication services, and a network layer under the transport layer to route data supplied by the transport layer, and wherein each of the security rules is associated with a rule type from a set of rule types and further comprises a protective action to perform in response to the condition of the security rule being met;

categorizing the alert packages by the rule types in the set of rule types to which the security rules whose conditions were met are associated;

for the alert packages categorized within the rule types, generating a set of one or more security attribute identifier-value signatures; and for each of the security attribute identifier-value signatures, transmitting data to the set of ADs that represents to the set of ADs a collection rule to apply based on that security attribute identifier-value signature, wherein the collection rule includes a condition, including a set of one or more attributes, wherein each of the set of attributes of the collection rule includes an attribute identifier and a set of one or more attribute values, wherein the collection rule further includes an action to generate a collection package in response to the condition of the collection rule being met, wherein the condition of the collection rule being met does not result in performing a protective action.

16. The set of one or more non-transitory computer readable storage media of claim 15, wherein security rules in each rule type target a same web application layer attack.

17. The set of one or more non-transitory computer readable storage media of claim 15, wherein the set of one or more security attribute identifier-value signatures is generated according to an attribute identifier signature or a collection rule template defined for the associated rule type.

18. The set of one or more non-transitory computer readable storage media of claim 15, wherein transmitting data to the set of ADs for each security attribute identifier-value signature comprises:

generating the collection rule based on the security attribute identifier-value signature and a collection rule template for the rule type associated with the security attribute identifier-value signature, wherein the collection rule is the data transmitted to the set of ADs.

19. The set of one or more non-transitory computer readable storage media of claim 15, wherein the operations further comprise:

receiving, from the set of ADs, a plurality of collection packages associated with a second set of web application layer request messages sent by the set of HTTP clients to the set of web application servers, wherein each collection package in the plurality of collection packages was sent responsive to a respective second set of one or more packets that collectively carried a respective web application layer request message in the second set of web application layer request messages and that resulted in the condition of one of the collection rules being met, wherein each of the collection rules is associated with a rule type from the set of rule types, categorizing the collection packages by the rule types to which the collection rules whose conditions were met are associated;

for the collection packages categorized within the rule types, generating a set of one or more collection attribute identifier-value signatures according to a set of one or more profiler and security rule template tuples defined for that rule type; and for each of the collection attribute identifier-value signatures, transmitting data to the set of ADs that represents to the set of ADs a new security rule to apply based on that collection attribute identifier-value signature.

20. The set of one or more non-transitory computer readable storage media of claim 19, wherein the generating a set of one or more collection attribute identifier-value signatures comprises:

for the collection packages of each rule type, applying a set of one or more profilers identified for that rule type; and for a result of each profiler, determining if the result of the profiling will find malicious traffic and with a number of false positives below a threshold value.

21. The set of one or more non-transitory computer readable storage media of claim 20, wherein the generating a set of one or more security attribute identifier-value signatures comprises:

for the alert packages of each rule type, grouping the alert packages according to the grouping criteria defined for that rule type; and for each group of the alert packages, characterizing the group of alert packages with a security attribute identifier-value signature according to a collection rule template defined for that rule type.

22. A computing device communicatively coupled to a set of one or more web application layer attack detectors (ADs), wherein the set of ADs are communicatively coupled between a set of one or more Hypertext Transfer Protocol (HTTP) clients and a set of one or more web application servers to protect the set of web application servers against web application layer attacks, and wherein the set of ADs apply security rules that each comprise a condition, including a set of one or more attributes, wherein each of the set of attributes includes an attribute identifier and a set of one or more attribute values, the computing device comprising:
one or more processors; and
a non-transitory machine-readable storage medium having instructions stored therein, which when executed by the one or more processors, causes the computing device to:
receive, from the set of ADs, a plurality of alert packages associated with a first set of web application layer request messages sent by the set of HTTP clients to the set of web application servers, wherein each alert package in the plurality of alert packages was sent responsive to a respective first set of one or more packets that collectively carried a respective web application layer request message in the first set of web application layer request messages and that resulted in the condition of one of the security rules being met, wherein each packet in the first set of packets is sent using a protocol stack including an application layer that carries the web application layer messages, a transport layer under the application layer to provide end-to-end communication services, and a network layer under the transport layer to route data supplied by the transport layer, and wherein each of the security rules is associated with a rule type from a set of rule types and further comprises a protective action to perform in response to the condition of the security rule being met;
categorize the alert packages by the rule types to which the security rules whose conditions were met are associated;
for the alert packages categorized within the rule types, generate a set of one or more security attribute identifier-value signatures; and
for each of the security attribute identifier-value signatures, transmit data to the set of ADs that represents to the set of ADs a collection rule to apply based on that security attribute identifier-value signature,
wherein the collection rule includes a condition, including a set of one or more attributes, wherein each of the set of attributes of the collection rule includes an attribute identifier and a set of one or more attribute values, wherein the collection rule further includes an action to generate a collection package in response to the condition of the collection rule being met, wherein the condition of the collection rule being met does not result in performing a protective action.

23. The computing device of claim 22, wherein security rules in each rule type target a same web application layer attack.

24. The computing device of claim 22, wherein the set of one or more security attribute identifier-value signatures is generated according to an attribute identifier signature or a collection rule template defined for the associated rule type.

25. The computing device of claim 22, wherein transmitting data to the set of ADs for each security attribute identifier-value signature comprises:
generating the collection rule based on the security attribute identifier-value signature and a collection rule template for the rule type associated with the security attribute identifier-value signature,
wherein the collection rule is the data transmitted to the set of ADs.

26. The computing device of claim 22, where the instructions further cause the computing device to:
receive, from the set of ADs, a plurality of collection packages associated with a second set of web application layer request messages sent by the set of HTTP clients to the set of web application servers, wherein each collection package in the plurality of collection package was sent responsive to a respective second set of one or more packets that collectively carried a respective web application layer request message in the second set of web application layer request messages and that resulted in the condition of one of the collection rules being met, wherein each of the collection rules is associated with a rule type from the set of rule types,
categorize the collection packages by the rule types to which the collection rules whose conditions were met are associated;
for the collection packages categorized within the rule types, generate a set of one or more collection attribute identifier-value signatures according to a set of one or more profiler and security rule template tuples defined for that rule type; and
for each of the collection attribute identifier-value signatures, transmit data to the set of ADs that represents to the set of ADs a new security rule to apply based on that collection attribute identifier-value signature.

27. The computing device of claim 26, wherein generating a set of one or more collection attribute identifier-value signatures comprises:
for the collection packages of each rule type, applying a set of one or more profilers identified for that rule type; and
for a result of each profiler, determining if the result of the profiling will find malicious traffic and with a number of false positives below a threshold value.

28. The computing device of claim 27, wherein generating a set of one or more security attribute identifier-value signatures comprises:
for the alert packages of each rule type, grouping the alert packages according to the grouping criteria defined for that rule type; and
for each group of the alert packages, characterizing the group of alert packages with a security attribute identifier-value signature according to a collection rule template defined for that rule type.

* * * * *